(12) United States Patent
Kataoka

(10) Patent No.: US 11,588,417 B2
(45) Date of Patent: Feb. 21, 2023

(54) VIBRATION ACTUATOR AND DRIVING DEVICE FOR VIBRATION ACTUATOR

(71) Applicant: CANON KABUSHIKI KAISHA, Tokyo (JP)

(72) Inventor: Kenichi Kataoka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 314 days.

(21) Appl. No.: 16/846,982

(22) Filed: Apr. 13, 2020

(65) Prior Publication Data

US 2020/0343831 A1 Oct. 29, 2020

(30) Foreign Application Priority Data

Apr. 25, 2019 (JP) .............................. JP2019-084357

(51) Int. Cl.
*H02N 2/14* (2006.01)
*H02N 2/10* (2006.01)
*H02N 2/12* (2006.01)

(52) U.S. Cl.
CPC ............. *H02N 2/147* (2013.01); *H02N 2/101* (2013.01); *H02N 2/123* (2013.01)

(58) Field of Classification Search
CPC ........ H02N 2/147; H02N 2/101; H02N 2/123; H02N 2/163; H02N 2/0015; H02N 2/026; H02N 2/145; H02N 2/065; H02N 2/103; H02N 2/0075; H02N 2/067
See application file for complete search history.

(56) References Cited

U.S. PATENT DOCUMENTS

| 4,879,528 | A | * | 11/1989 | Gotanda | ............... B06B 1/0253 |
|---|---|---|---|---|---|
| | | | | | 331/25 |
| 5,285,134 | A | | 2/1994 | Kataoka | |
| 5,939,847 | A | * | 8/1999 | Ashizawa | .............. H02N 2/142 |
| | | | | | 318/116 |
| 6,765,335 | B2 | | 7/2004 | Wischnewskiy | |
| 7,646,136 | B2 | | 1/2010 | Adachi et al. | |
| 9,579,846 | B2 | * | 2/2017 | Kamigaito | .......... B29C 66/8223 |
| 10,031,316 | B2 | | 7/2018 | Sumioka | |
| 10,644,617 | B2 | | 5/2020 | Kataoka | |
| 2007/0103092 | A1 | * | 5/2007 | Millner | ................. H01J 37/321 |
| | | | | | 315/276 |

(Continued)

FOREIGN PATENT DOCUMENTS

DE 10 2011 087 542 B3 4/2013
EP 1 267 425 A2 12/2002

(Continued)

OTHER PUBLICATIONS

Extended European Search Report dated Jul. 28, 2020, in European Patent Application No. 20170088.7.

*Primary Examiner* — Emily P Pham
(74) *Attorney, Agent, or Firm* — Venable LLP

(57) ABSTRACT

A vibration actuator is capable of reducing differences in vibration phase and vibration amplitude without raising a voltage of a drive circuit when driving a contact member using a plurality of vibrators connected in series. The vibration actuator includes a vibrator device and a contact member that moves relative to the vibrator device. The vibrator device includes transformers of which primary coils are connected in series, and vibrators that are respectively connected in parallel to secondary coils of the transformers.

17 Claims, 20 Drawing Sheets

(56) References Cited

U.S. PATENT DOCUMENTS

| | | | | |
|---|---|---|---|---|
| 2008/0067949 A1* | 3/2008 | Cheng | ................ | H05B 41/2822 |
| | | | | 315/255 |
| 2008/0088203 A1 | 4/2008 | Su | | |
| 2014/0145649 A1* | 5/2014 | Atsuta | .................... | H02N 2/142 |
| | | | | 318/116 |
| 2017/0214330 A1* | 7/2017 | Yang | ....................... | H02M 3/01 |

FOREIGN PATENT DOCUMENTS

| | | |
|---|---|---|
| EP | 2 522 493 A2 | 11/2012 |
| JP | 59-120389 A | 7/1984 |
| JP | 2008-278712 A | 11/2008 |
| JP | 2015-233399 A | 12/2015 |

\* cited by examiner

COMPARATIVE EXAMPLE

COMPARATIVE EXAMPLE

VIBRATION ACTUATOR AND DRIVING DEVICE FOR VIBRATION ACTUATOR

BACKGROUND OF THE INVENTION

Field of the Invention

The present invention relates to a vibration actuator and a driving device for the vibration actuator.

Description of the Related Art

There is a known conventional mechanism that drives a contact member using a plurality of vibrators. The plurality of vibrators employ electro-mechanical energy conversion elements, such as piezoelectric devices and electrostriction elements, and are driven by a common drive circuit. This reduces a circuit structure as compared with a case where individual drive circuits are respectively installed for the plurality of vibrators. As a related technique, a vibration driving device in which vibrators are connected in parallel to a secondary coil of a booster transformer is proposed (see Japanese Laid-Open Patent Publication (Kokai) No. 2015-233399 (JP 2015-233399A)). Moreover, a driving device in which two piezoelectric devices arranged on a straight line drive a tabular single movable body is proposed (see Japanese Laid-Open Patent Publication (Kokai) No. 2008-278712 (JP 2008-278712A)).

The vibrators of the vibration driving device of JP 2015-233399A are connected in parallel. In this case, since the electric currents that flow through the respective vibrators are different because of differences in a resonance frequency and a load of the respective vibrators, differences in vibration amplitude and vibration phase of the respective vibrators become large. Accordingly, when one contact member is driven by a plurality of vibrators connected in parallel, a sliding loss occurs owing to the differences in the vibration amplitude and vibration phase, which lowers a driving efficiency of the contact member.

The two piezoelectric devices of the driving device of JP 2008-278712A are electrically connected in series. In this case, a difference between the electric currents that flow through the respective piezoelectric devices becomes small as compared with a case in which two piezoelectric devices are connected in parallel. Thereby, although the difference in the vibration phase becomes small, the difference in the vibration amplitude may become large depending on differences in the resonance frequency and load of the piezoelectric devices. If the piezoelectric devices are connected in series, when carried out, the voltage of both ends of the series connection of the piezoelectric devices rises to a high voltage.

SUMMARY OF THE INVENTION

The present invention provides a vibration actuator and a driving device therefor that are capable of reducing differences in vibration phase and vibration amplitude without raising a voltage of a drive circuit when driving a contact member using a plurality of vibrators connected in series.

Accordingly, a first aspect of the present invention provides a vibration actuator including a vibrator device and a contact member that moves relative to the vibrator device. The vibrator device includes transformers of which primary coils are connected in series, and vibrators that are respectively connected in parallel to secondary coils of the transformers.

Accordingly, a second aspect of the present invention provides a driving device for the vibration actuator of the first aspect, the driving device including a drive signal generator that generates an alternating voltage applied to the vibrator device, an amplitude detector that detects amplitude of the alternating voltage from an electric current flowing to the vibrator device, and a drive signal controller that controls the alternating voltage that the drive signal generator generates according to the amplitude of the electric current.

According to the present invention, the differences in vibration phase and vibration amplitude can be reduced with a low-voltage drive circuit when driving the contact member using a plurality of vibrators connected in series.

Further features of the present invention will become apparent from the following description of exemplary embodiments with reference to the attached drawings.

DESCRIPTION OF THE EMBODIMENTS

Figure 1B:
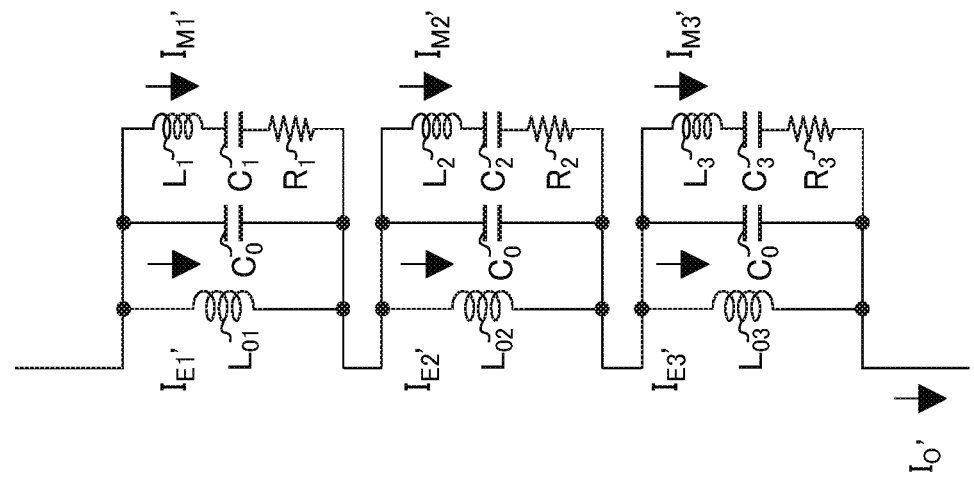
FIG. 1A and FIG. 1B are views showing an example of a configuration of a vibrator device concerning a first embodiment.

Hereafter, embodiments according to the present invention will be described in detail by referring to the drawings. Configurations described in the following embodiments are only examples, and the scope of the present invention is not limited by the configurations described in the embodiments.

Figure 1A:
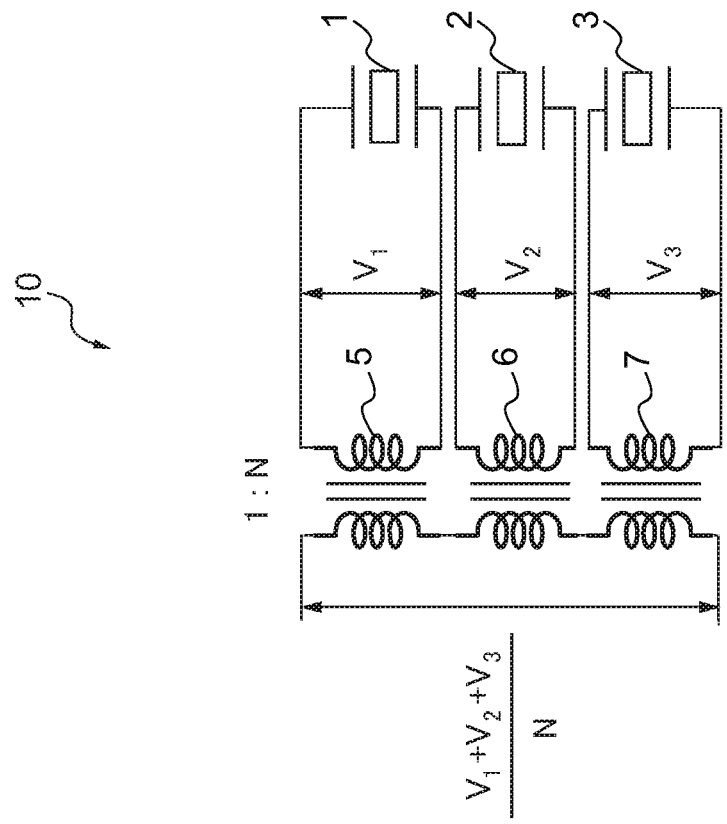

FIG. 1A and FIG. 1B are views showing an example of a configuration of a vibrator device 10 concerning a first embodiment. The vibrator device 10 contacts a contact member and moves relative to the contact member. Thereby, the vibrator device 10 drives the contact member. The vibrator device 10 of FIG. 1A has three vibrators 1, 2, and 3 and three transformers 5, 6, and 7. Electric-mechanical energy conversion devices, such as piezoelectric members and electrostriction elements, are joined to the vibrators 1, 2, and 3. The vibrator 1 is connected in parallel to a secondary coil of the transformer 5. The vibrator 2 is connected in parallel to a secondary coil of the transformer 6. The vibrator 3 is connected in parallel to a secondary coil of the transformer 7. A primary coil of the transformer 5, a primary coil of the transformer 6, and a primary coil of the transformer 7 are connected in series.

FIG. 1B is an equivalent circuit diagram of the vibrator device 10 of FIG. 1A in a case where ideal transformers of which winding ratio is "1" are used. Although this embodiment describes the case where the piezoelectric members are joined to the vibrators 1, 2, and 3, the vibrators 1, 2, and 3 themselves may be configured by piezoelectric members. Moreover, a piezoelectric member may be a lamination piezoelectric member. Hereinafter, the following description assumes that a piezoelectric member is joined to each of the vibrators. The number of the vibrators of the vibrator device 10 and the number of inductors are not limited to three. As shown in the equivalent circuit diagram of FIG. 1B, the vibrators 1, 2, and 3 are equivalently connected in series through the transformers.

Figure 2A:
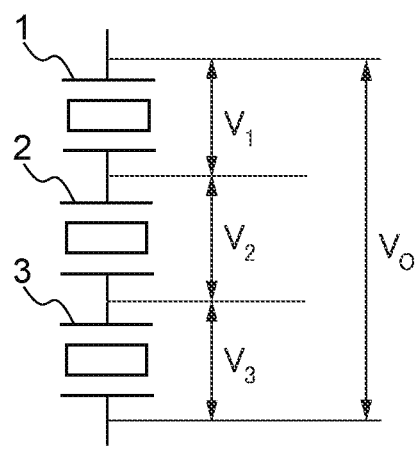
FIG. 2A and FIG. 2B are views showing an example of a configuration of a vibrator device of a comparative example.
Figure 2B:
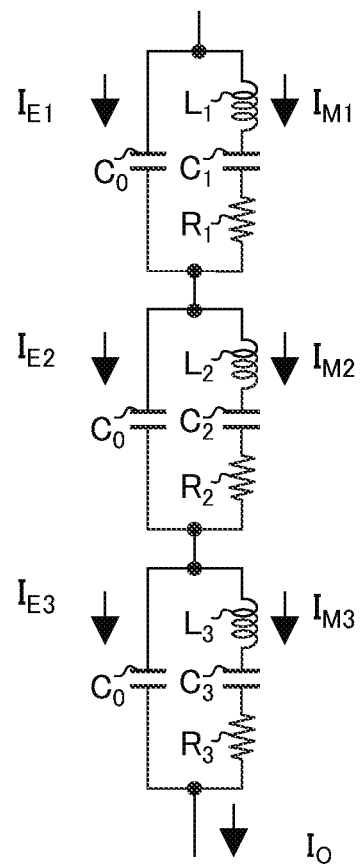

Next, an example of a vibrator device of a comparative example will be described. FIG. 2A and FIG. 2B are views showing the example of a configuration of the vibrator device of the comparative example. As shown in FIG. 2A, the vibrator device of the comparative example is configured by connecting three vibrators 1, 2, and 3 to which piezoelectric members are joined in series. When an alternating voltage of which frequency is close to a resonance frequency is applied to the vibrators 1, 2, and 3 that are electrically connected in series, vibrations are excited in the vibrators 1, 2, and 3. The vibrators 1, 2, and 3 are pressed against the contact member. Vibrations excited in the vibrators cause thrust at contact positions between the contact member and the vibrators, which drive the contact member. Since the plurality of vibrators are electrically connected in series, the thrust to the contact member can be reinforced and difference of the vibrations of the vibrators can be reduced. In the case where the vibrators are connected in series, uniformization of the amplitudes and the electric currents flowing to the vibrators is easier than that in a case where the vibrators are connected in parallel even if resonance frequencies and loads of the respective vibrators are different.

However, the amplitude of the alternating voltage required to excite the vibrators increases with increasing of the number of the vibrators. Accordingly, when there are many vibrators connected in series, the alternating voltage applied to both ends of the vibrators connected in series as shown in FIG. 2A (both ends of the series connection) becomes a high voltage, and a counterplan against high voltage is needed. For example, when the alternating voltages V1, V2, and V3 are respectively applied to the vibrators 1, 2, and 3 of FIG. 2A, the alternating voltage Vo (Vo=V1+V2+V3) is applied to both ends of the series connection. Accordingly, the alternating voltage Vo increases as the number of the vibrators connected in series increases.

In this embodiment, the vibrators 1, 2, and 3 are respectively connected in parallel to the secondary coils of the transformers 5, 6, and 7 as shown in FIG. 1A. Moreover, the vibrator 1, vibrator 2, and vibrator 3 are electrically insulated. The primary coils of the transformers 5, 6, and 7 are connected in series, and both ends of the series connection of the primary coils of the transformers 5, 6, and 7 are input terminals for the alternating voltage. Accordingly, even if the vibrator 1, vibrator 2, and vibrator 3 are not connected directly as shown in FIG. 1A, the alternating voltage equivalent to the case of the series connection can be applied to each of the vibrators.

Moreover, since the vibrator 1, vibrator 2, and vibrator 3 are not connected directly, the alternating voltages applied to the respective vibrators are not added. As shown in FIG. 1A, a terminal voltage of the secondary coil of the transformer 5 shall be V1, a terminal voltage of the secondary coil of the transformer 6 shall be V2, and a terminal voltage of the secondary coil of the transformer 7 shall be V3. Since the vibrator 1, vibrator 2, and vibrator 3 are not connected directly, the alternating voltage beyond the terminal voltage V1 is not applied to the vibrator 1. Similarly, the alternating voltage beyond the terminal voltage V2 is not applied to the vibrator 2, and the alternating voltage beyond the terminal voltage V3 is not applied to the vibrator 3.

In the meantime, since the transformers 5, 6, and 7 are connected in series, the alternating voltages are added. When the winding ratio of the transformers is 1:N, the terminal voltage of the primary coil of each of the transformers 5, 6, and 7 is found by dividing the terminal voltage of the secondary coil by N. Accordingly, the alternating voltage of both ends of the series connection of the transformers 5, 6, and 7 becomes "(V1+V2+V3)/N". N is more than 1. Thereby, the alternating voltage applied to the vibrator device 10 becomes a low voltage as compared with the case of FIG. 2A. In the above description, the winding ratio of all the transformers is set to 1:N, but the winding ratios of all or a part of the transformers may be different from 1:N. In this case, the ratio of the vibration velocities of the vibrators 1, 2, and 3 can be changed. The details about this point will be mentioned later.

FIG. 2B is an equivalent circuit diagram of FIG. 2A. A circuit that consists of C0, L1, C1, and R1 indicates the equivalent circuit of the vibrator 1. A circuit that consists of C0, L2, C2, and R2 indicates the equivalent circuit of the vibrator 2. A circuit that consists of C0, L3, C3, and R3 indicates the equivalent circuit of the vibrator 3. The damping capacitance C0 of each equivalent circuit indicates the electric characteristic of the piezoelectric member that is joined to each of the vibrators 1, 2, and 3. The series resonant circuits that consist of Lx, Cx, and Rx (x is an integer of 1 to 3) indicates mechanical characteristics of the vibrators 1, 2, and 3. Reference symbols IE1, IE2, and IE3 show values of electric currents that flow through the damping capacitances C0 of the vibrators 1, 2, and 3. Reference symbols IM1, IM2, and IM3 show values of electric currents that flow through the series resonant circuits (Lx, Cx, and Rx) of the vibrators 1, 2, and 3. Then, a value of an electric current Io becomes equal to "IE1+IM1", "IE2+IM2", and "IE3+IM3".

Figure 3A:
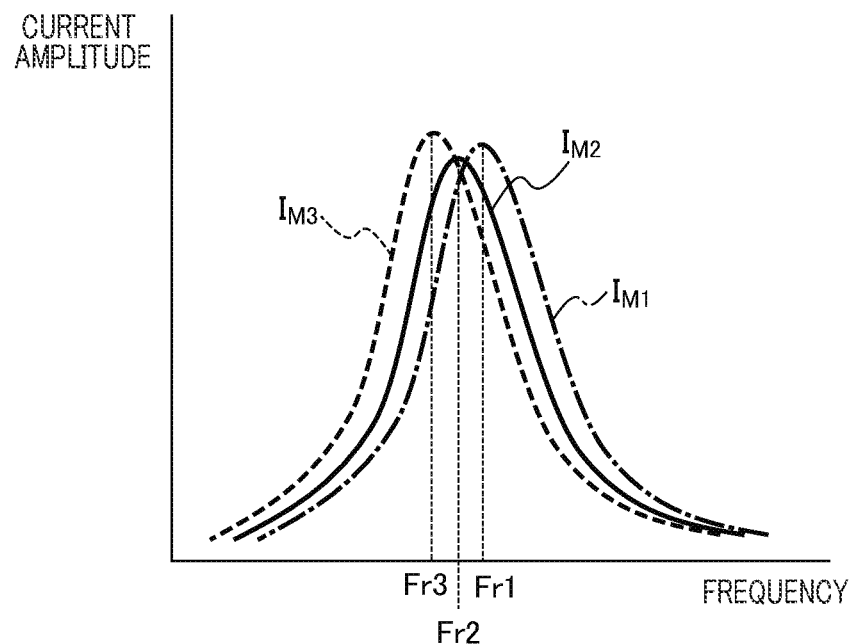
FIG. 3A and FIG. 3B are graphs showing electric current amplitude characteristics with respect to a frequency corresponding to the configuration of FIG. 2A and FIG. 2B.
Figure 3B:
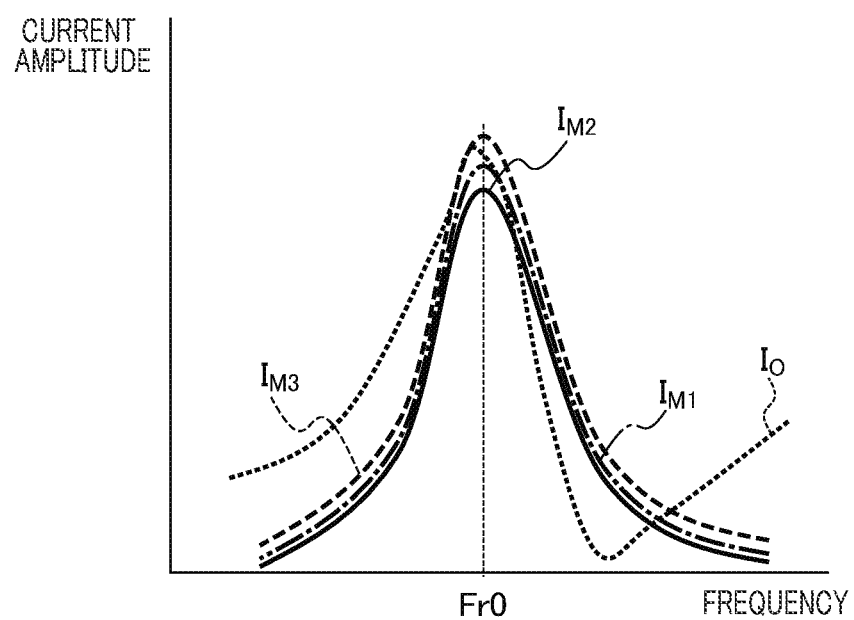

FIG. 3A is the graph showing electric current amplitude characteristics with respect to a frequency in cases where the same alternating voltages are applied to the vibrators 1, 2, and 3. The vibrators 1, 2, and 3 have the electric current characteristics that the amplitudes are maximized at different resonance frequencies Fr1, Fr2, and Fr3. FIG. 3B is the graph showing the amplitudes of the electric currents IM1 (an alternate long and short dash line), IM2 (a solid line), IM3 (a broken line), and Io (a dotted line) with respect to the frequency of the alternating voltage applied to the series resonant circuits (Lx, Cx, and Rx) in FIG. 2B.

As shown in FIG. 3B, when the alternating voltages are applied to the series resonant circuits (Lx, Cx, and Rx) in FIG. 2B, the amplitudes of the electric currents IM1, MI2, and IM3 that represent vibration velocities of the vibrators 1, 2, and 3 are maximized at the resonance frequency Fr0. However, the maximum amplitudes of the respective electric currents are different. When the maximum amplitudes of the electric currents of the vibrators 1, 2, and 3 differ at the resonance frequency Fr0, the vibration velocities of the vibrators 1, 2, and 3 differ. When the vibrators 1, 2, and 3 press the contact member to drive in the state where the vibration velocities of the vibrators 1, 2, and 3 differ, sliding amounts at the contact positions of the contact member differ. When the sliding amounts differ, loss that does not contribute to the driving occurs, which lowers driving efficiency of the contact member.

Moreover, as shown in FIG. 3B, the variation of the electric current Io that flows through the vibrator device 10 differs from the variations of the electric currents IMx (x is an integer of 1 to 3) greatly. Accordingly, it is difficult to accurately detect the amounts of the electric currents IMx by detecting the electric current Io.

Next, the equivalent circuit in FIG. 1B will be described. The equivalent circuit of each of the vibrators 1, 2, and 3 is configured by connecting the damping capacitance C0 to the series circuit constituted by Lx, Cx, and Rx (x is an integer of 1 to 3) in parallel. The equivalent circuit in FIG. 1B is configured by adding inductors L01, L02, and L03 that show the equivalent circuits of the transformers to the equivalent circuit in FIG. 2B.

In the equivalent circuit diagram of FIG. 1B, the vibrators 1, 2, and 3 are connected in series through the transformers 5, 6, and 7. Since the vibrators 1, 2, and 3 are equivalently connected in series, the same electric current flows into the vibrators 1, 2, and 3 basically. The inductor L0x (x is an integer of 1 to 3) connected in parallel to the damping capacitance C0 parallelly resonates at a predetermined frequency.

Accordingly, the electric current IEx' (x is an integer of 1 to 3) that flows into the parallel circuit consisting of the inductor L0x and the damping capacitance C0 approaches zero at a frequency near the parallel resonance frequency. When the electric currents IEx' become about zero, the electric currents IMx'+IEx' (x is an integer of 1 to 3) become approximately equal to the electric currents IMx'. Accordingly, the electric current Io' that flows through the vibrator device 10 shown in FIG. 1A becomes approximately equal to the electric currents IMx'.

Figure 4:
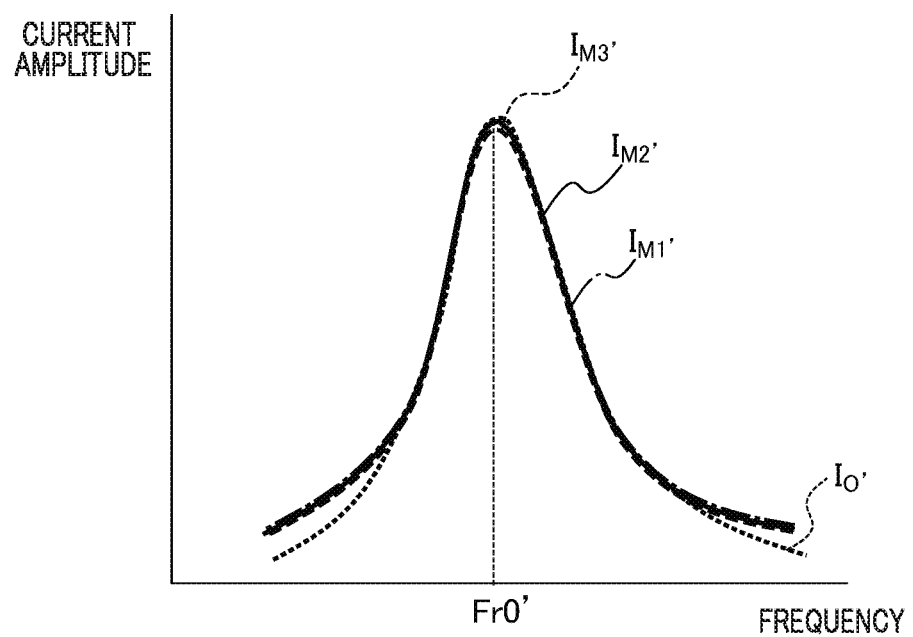
FIG. 4 is a graph showing amplitude of electric current with respect to a frequency of alternating voltage applied to the series circuit of FIG. 1B.

FIG. 4 is a graph showing the amplitudes of the electric current IM1' (an alternate long and short dash line), IM2' (a solid line), IM3' (a broken line), and Io' (a dotted line) with respect to the frequency of the alternating voltage applied to the series resonant circuits (Lx, Cx, and Rx) in FIG. 1B. The amplitudes of the electric currents IM1', IM2', and IM3' are approximately equal and are maximized at the same resonance frequency Fr0'. The resonance frequency Fr0' is approximately equal to an average value of the resonance frequency Fr1 of the vibrator 1, the resonance frequency Fr2 of the vibrator 2, and the resonance frequency Fr3 of the vibrator 3. Moreover, the amplitude of the electric current Io' becomes approximately equal to the amplitudes of the electric currents IMx' in a frequency range in which the amplitudes are more than a predetermined value.

As mentioned above, the vibrator device 10 of FIG. 1A employs the configuration in which the vibrators are respectively connected in parallel to the secondary coils (inductors) of the transformers and the primary coils of the transformers are connected in series. Thereby, even when the plurality of vibrators are vibrated with one drive voltage, the vibration amplitudes and vibration phases of the vibrators 1, 2, and 3 can be made uniform. As a result, the thrusts that the vibrators generate can be efficiently transferred to one contact member. Moreover, since the vibrator device 10 employs the above configuration, the alternating voltage applied to the vibrator device 10 is lowered as mentioned above.

Figure 5A:
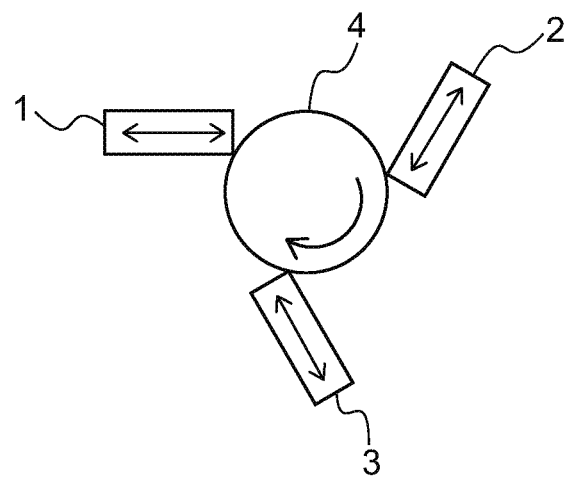
FIG. 5A is a view showing a configuration of a vibration actuator that rotates a cylindrical shaft.
Figure 5B:
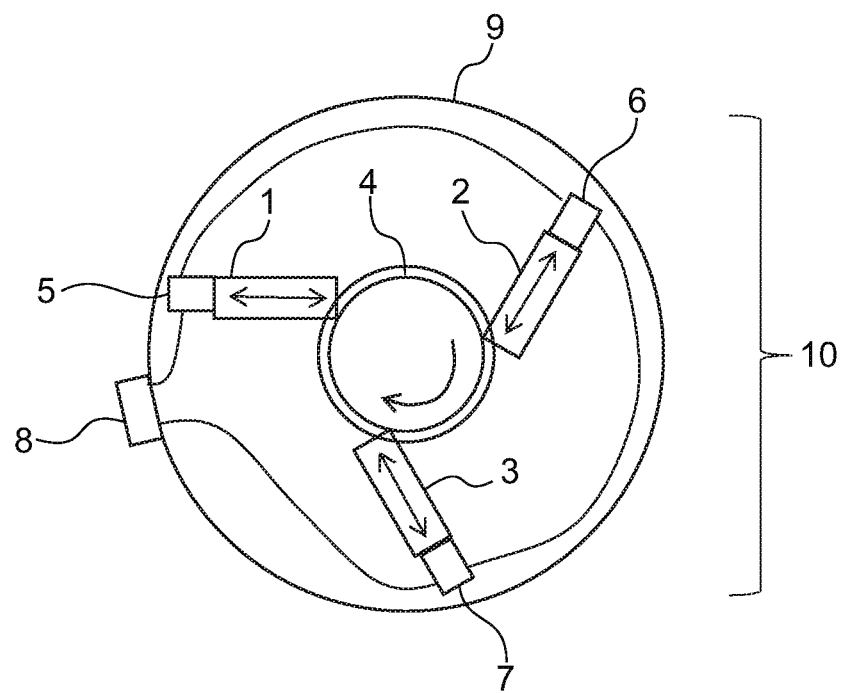
FIG. 5B is a view showing an electric connecting relation thereof.

FIG. 5A and FIG. 5B are views showing a configuration and an electric connecting relation of a vibration actuator that rotates a cylindrical shaft. FIG. 5A is a view showing the configuration of the vibration actuator that rotates the cylindrical shaft while three vibrators contact the outer peripheral surface of the cylindrical shaft. The vibrators 1, 2, and 3 respectively vibrate in a vertical direction (a direction of an arrow). The cylindrical shaft 4 is an example of the contact member. The vibrators 1, 2, and 3 are arranged around the cylindrical shaft 4 at nearly equal intervals of 120 degrees. The vibrators 1, 2, and 3 are equally pressed to the cylindrical shaft 4 by pressurizing mechanisms (not shown). The cylindrical shaft 4 is rotated clockwise by vibrations in the vertical direction that are excited in the vibrators 1, 2, and 3.

FIG. 5B is a view showing the electric connection relation in the vibrator device 10. The secondary coils of the transformers 5, 6, and 7 are respectively connected in parallel to the piezoelectric members joined to the vibrators 1, 2, and 3. The vibrator device 10 is provided with a connector 8 to input an alternating voltage. The primary coils of the transformers 5, 6, and 7 are connected in series, and both the ends of the series connection are connected to the connector 8. The vibrators 1, 2, and 3, and the transformers 5, 6, and 7 are stored in a ring-shape casing 9, and these are united to constitute the vibrator device 10. Moreover, the vibrators 1, 2, and 3 have projection members that press the cylindrical shaft 4 that passes a hollow cylindrical part of the casing 9. The projection members are arranged at angular intervals of 120 degrees in the hollow cylindrical part. Each of the projection members is pressed to the cylindrical shaft 4 by a support member including a spring structure (not shown) at a fixed pressure. Moreover, the projecting amount and pressure force of each projection member are adjustable by a rotation linear motion conversion mechanism that is provided in the casing 9.

Figure 6:
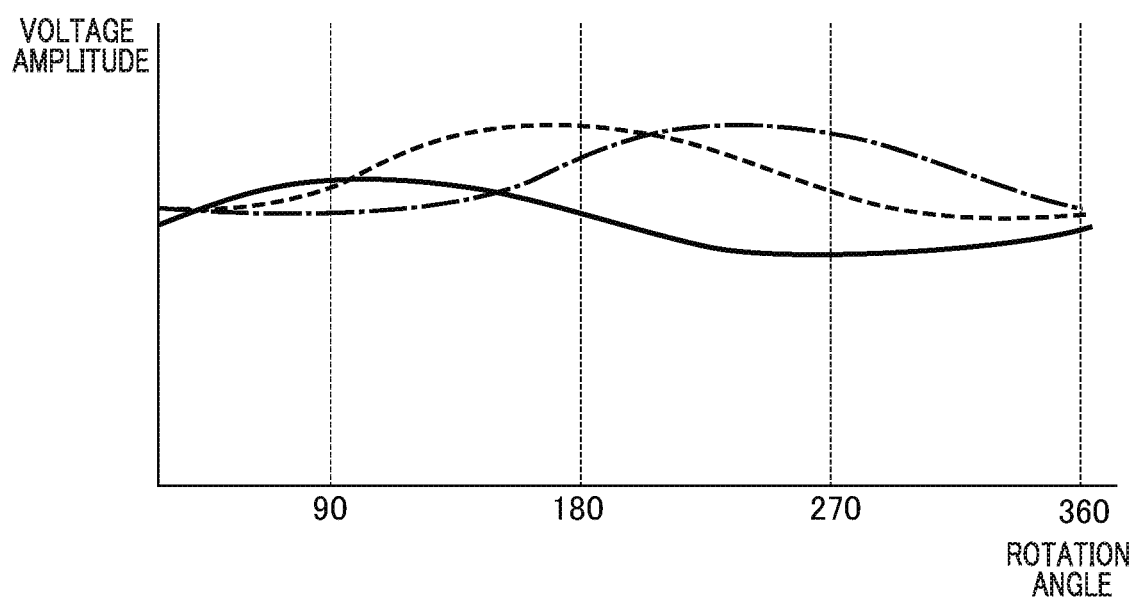
FIG. 6 is a graph showing relationships between a rotation angle and amplitudes of alternating voltages applied to the respective vibrators when the cylindrical shaft shown in FIG. 5A is driven to rotate.

FIG. 6 is a graph showing relationships between a rotation angle and amplitudes of alternating voltages applied to the respective vibrators 1, 2, and 3 when the cylindrical shaft 4 is driven by applying the alternating voltages to the vibrator device 10. Load fluctuation of one cycle occurs in synchronization with the rotation of the cylindrical shaft 4 because of load fluctuation under the influence of decentering of the cylindrical shaft 4. Accordingly, the voltage amplitude increases with increasing of the load, and the voltage amplitude decreases with decreasing of the load. Since the vibrators 1, 2, and 3 are arranged around the cylindrical shaft 4 at the nearly equal intervals of about 120 degrees, rotation phases of the three waveforms (waveforms showing the voltage amplitudes of the vibrators 1, 2, and 3) in FIG. 6 are shifted by about 120 degrees. Moreover, the averages of the voltage amplitudes of the vibrators 1, 2, and 3 during the rotation of the cylindrical shaft 4 are different from each other. This is mainly attributed to difference in internal loss and/or resonance frequency between the vibrators 1, 2, and 3.

As mentioned above, in the vibrator device 10 of this embodiment, the vibrators are connected to the respective secondary coils of the transformers in parallel, and the primary coils of the transformers are connected in series. Accordingly, since the vibration amplitudes and vibration phases of the vibrators 1, 2, and 3 are made uniform, the difference in the vibration velocities of the vibrators can be reduced. Thereby, even if a difference occurs in the resonance frequency or the load of the vibrators 1, 2, and 3, the vibration phases and vibration amplitudes of the alternating voltages that are applied are adjusted automatically, and the vibration velocities of the vibrators 1, 2, and 3 are made uniform. As a result, the cylindrical shaft 4 as the contact member can be driven with high efficiency.

Figure 7:
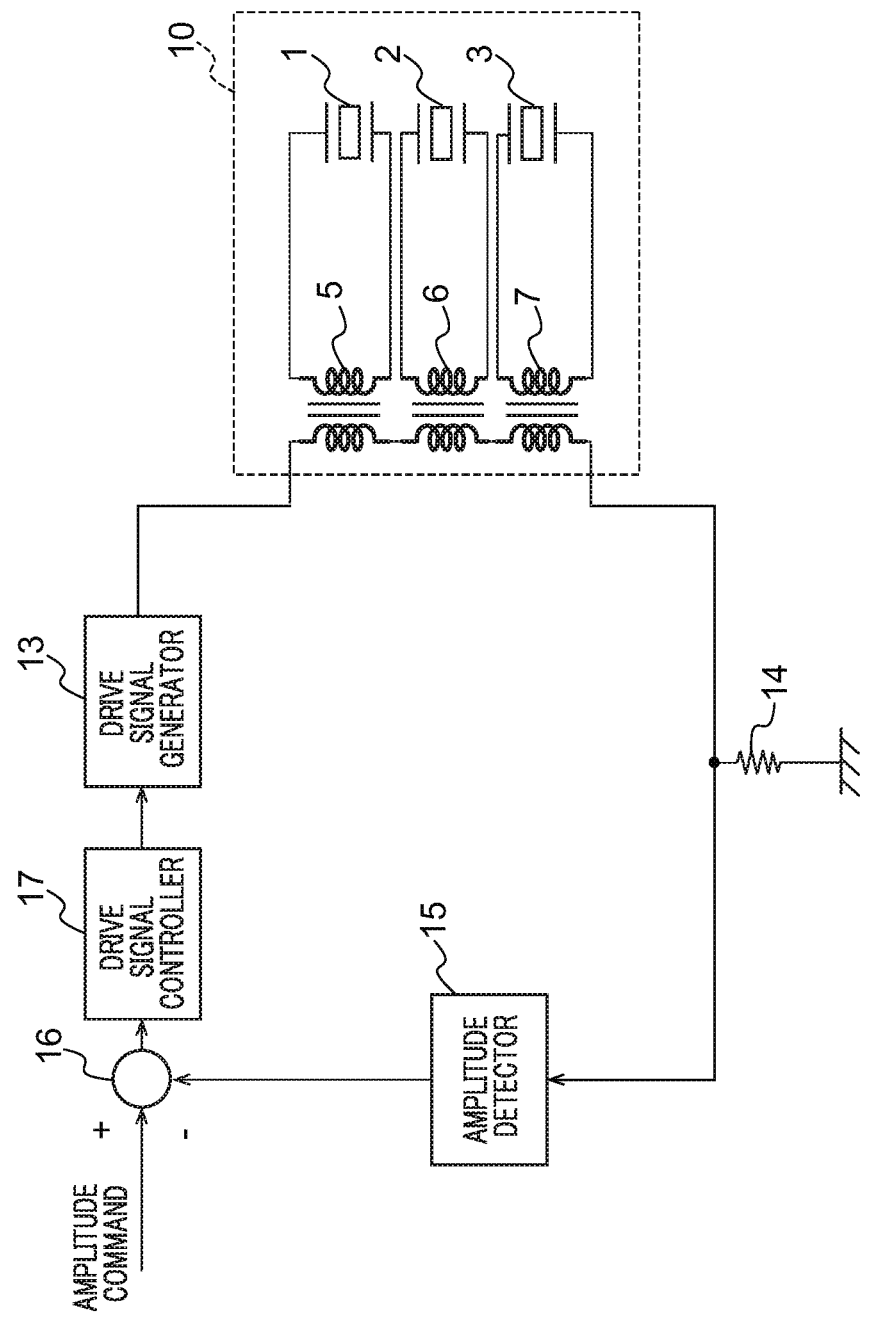
FIG. 7 is a view showing a first example of a drive circuit for the vibration actuator concerning the first embodiment.

FIG. 7 is a view showing a first example of a drive circuit for the vibration actuator that uses the vibrator device 10 concerning the first embodiment. The drive circuit for the vibration actuator corresponds to the driving device for the vibration actuator. The drive circuit for the vibration actuator shown in FIG. 7 has the vibrator device 10, a drive signal generator 13, a resistance 14, an amplitude detector 15, a comparator 16, and a drive signal controller 17. The vibrator device 10 corresponds to a part surrounded by a dotted line in FIG. 7. In the vibrator device 10, the primary coils of the transformers 5, 6, and 7 are connected in series. Moreover, the vibrators 1, 2, and 3 are respectively connected in parallel to the secondary coils of the transformers 5, 6, and 7.

The inductance value of the secondary coils of the transformers 5, 6, and 7 that are respectively connected in parallel to the vibrators 1, 2, and 3 is matched to a predetermined frequency near the resonance frequency of the vibrator device 10. For example, the predetermined frequency falls within a range of +−10% from the resonance frequency of the vibrator device 10. That is, a relation between a matching frequency F0, the damping capacitance C0, and the inductance value L0 of the secondary coil of the transformer is represented by the formula 1.

$$2\pi \cdot F_0 = \frac{1}{\sqrt{L_0 \cdot C_0}} \quad \text{[Formula 1]}$$

The drive signal generator 13 generates the alternating voltage applied to the vibrator device 10. The resistance 14 is connected to the vibrator device 10 in order to measure the electric current that flows through the vibrator device 10. The resistance 14 outputs the voltage proportional to the vibration velocity of the vibrators 1, 2, and 3. Although the vibration amplitude of a vibrator is proportional to a value obtained by integrating the vibration velocity by time in fact, the following description assumes that the vibration amplitude shall be controlled by controlling the amplitude of the vibration velocity because the amplitude of the vibration velocity is approximately proportional to the vibration amplitude.

The amplitude detector 15 detects the amplitude of the vibration velocity detected by the resistance 14. The comparator 16 compares a vibration amplitude command from a vibration amplitude command unit (not shown) with the output from the amplitude detector 15, and outputs a comparison result to the drive signal controller 17. The drive signal controller 17 controls the drive signal generator 13 on the basis of the comparison result that the comparing unit 16 outputs.

The drive signal controller 17 outputs a frequency command or an amplitude command to the drive signal generator 13. The electric current that flows through the vibrator device 10 is approximately proportional to the vibration velocity of the vibrators 1, 2, and 3 owing to the effects of the frequency matching of the transformers 5, 6, and 7. Since the resistance 14 detects the electric current that flows through the vibrator device 10 and the drive signal controller 17 controls the alternating voltage, the amplitudes of the vibrators 1, 2, and 3 are stably controlled with quick response.

Although a transformer is connected in parallel to each vibrator in the example of FIG. 7, a parallel circuit consisting of a transformer and a capacitor may be connected in parallel to each vibrator. When a capacitor is connected in parallel to each vibrator in addition to a transformer, a matching frequency can be finely tuned.

Next, failure of the vibrator device 10 in this embodiment will be described. Since the primary coils of the transformers 5, 6, and 7 are connected in series, the vibrator device 10 is able to continue to drive a contact member, even if failure, such as a short circuit or disconnection, occurs in a part of the vibrators 1, 2, and 3. Even if a part of the vibrators 1, 2, and 3 in FIG. 7 short-circuits electrically, the alternating voltage is continuously applied to the other vibrators. Since the short-circuited vibrator stops vibration, the loads of the other vibrators become heavy for that. Since the number of the available vibrators decreases, a thrust lowers if the applied voltage does not change. In the meantime, when the number of available vibrators decreases, feedback control that increases the voltage applied to the available vibrators so as to maintain the thrust starts automatically. Thereby, the drive control of the vibrator device 10 is continuable.

Next, a case where disconnection occurs in a connection with a vibrator will be described. Connection between a piezoelectric member and wiring may break under the influence of vibration, etc. Even in this case, the alternating voltage is continuously applied to the remaining unbroken vibrators because the primary coils of the transformers are connected in series. Since the disconnected vibrator stops, the loads of the other vibrators become heavy for that. Since the number of the available vibrators decreases, a thrust lowers if the applied voltage does not change. When disconnection occurs between a piezoelectric member joined to a vibrator and wiring, a secondary side of a transformer connected to the disconnected vibrator comes to a high impedance state, which increases the voltage amplitude of a primary side of a transfer connected to an available vibrator. As a result, exciting force of the available vibrator increases automatically. Thereby, the drive control of the vibrator device 10 is continuable.

When the short circuit or disconnection occurs in the vibrator device 10 as mentioned above, the electric current that flows through the vibrator device 10 increases as compared with the case where neither short circuit nor disconnection occurs. The resistance 14 is measuring the electric current that flows through the vibrator device 10. When the increase in the electric current that flows through the resistance 14 is detected, occurrence of failure such as short circuit and disconnection is detected. For example, when an amount of increase of the electric current that flows through the resistance 14 is more than a predetermined amount, the amplitude detector 15 detects that failure occurs in the vibrator device 10. Moreover, an amplifier circuit that amplifies the amplitude of the alternating voltage applied to the vibrators may be installed at the output side of the drive signal generator 13.

Figure 8A:
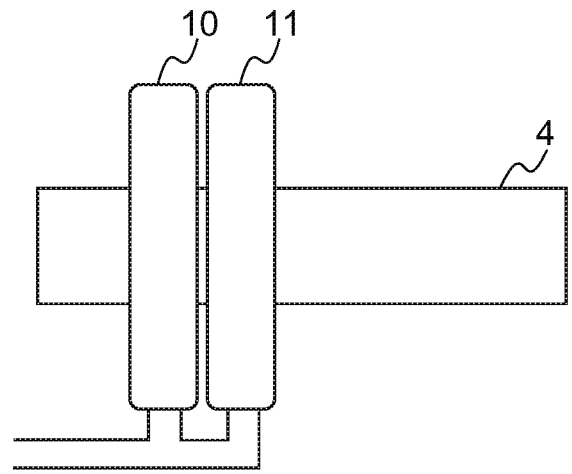
FIG. 8A and FIG. 8B are views showing examples of vibration actuators concerning the first embodiment.
Figure 8B:
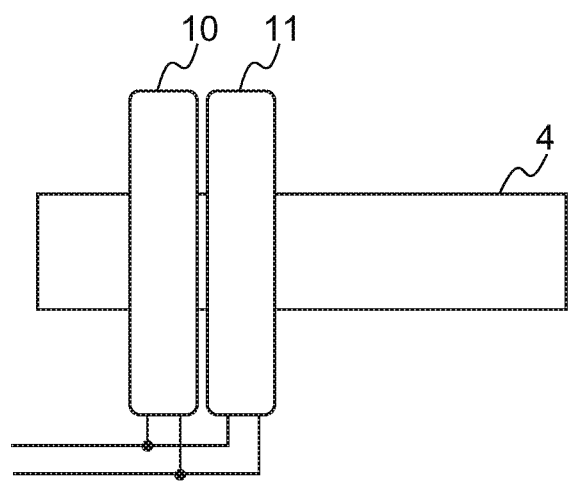

FIG. 8A and FIG. 8B are views showing examples of the vibration actuators concerning the first embodiment. FIG. 8A is a view showing an example of the vibration actuator that is constituted by connecting vibrator devices 10 and 11 in series. FIG. 8B is a view showing an example of the vibration actuator that is constituted by connecting the vibrator devices 10 and 11 in parallel.

The number of the vibrator devices connected in series or in parallel is not limited to two. The vibrator device 10 and the vibrator device 11 have an equivalent configuration. Three vibrators and three transformers are built in each of the vibrator devices 10 and 11. The primary coils of the three transformers are connected in series, and the vibrators are respectively connected in parallel to the three transformers. The number of the vibrators and transformers installed in the vibrator devices 10 and 11 is not limited to three. An average of resonance frequencies of the three vibrators installed in the vibrator devices 10 and 11 falls within a predetermined frequency range.

An example of manufacturing of the vibrator devices 10 and 11 shown in FIG. 8A and FIG. 8B will be described. The vibrator devices 10 and 11 may be manufactured manually or automatically. For example, when the fixed number (tens through hundreds, for example) of vibrators are manufactured, a list of resonance frequencies is created on the basis of measuring results of the resonance frequencies of the respective vibrators. Next, on the basis of the list of resonance frequency, the fixed number of vibrators are classified into some classes corresponding to the frequency ranges by referring to the resonance frequency list. For example, the fixed number of vibrators are classified every 500 Hz. Then, three vibrators are selected at random from the same class and the average of the resonance frequencies of the three vibrators is calculated. Random selection of three vibrators is repeated until obtaining a combination of three vibrators of which the average of resonance frequencies falls within a frequency range (for example, a predetermined frequency ±25 Hz or the predetermined frequency ±0.1%) that is beforehand decided for every class. When three vibrators of which the average of resonance frequencies falls within the frequency range that is beforehand decided for every class are obtained, one vibrator device is constituted by these three vibrators.

Accordingly, three vibrators of which the average of the resonance frequencies falls within the above-mentioned frequency range are built in one vibrator device. It is difficult to prepare many vibrators of which resonance frequencies are close. In the meantime, the method for preparing vibrators using the average of the resonance frequencies like this embodiment enables to prepare relatively large number of vibrators.

Moreover, the vibrators that constitute one vibrator device may be selected using dispersion of resonance frequencies instead of the average of resonance frequencies. In this case, vibrators of which the dispersion of the resonance frequencies falls within a predetermined dispersion range are built in one vibrator device. When the dispersion is set to a large value to some extent, there is unevenness of the resonance frequencies of the selected vibrators, which stabilizes the characteristic of the vibrator device. As mentioned above, when a vibration actuator is constituted by combining a plurality of vibrator devices of the same class, a high-power and high-efficiency vibration actuator is manufactured stably.

In the case in FIG. 8A, the two vibrator devices 10 and 11 are connected in series. When the number of the vibrator devices connected in series increases, it is necessary to enlarge the amplitude of the alternating voltage, which increases the applied voltage. When the applied voltage becomes high, the entire vibrator device is enlarged for applying an insulation countermeasure, etc. This increases cost. Accordingly, the configuration in which the vibrator devices 10 and 11 are connected in parallel can be employed as shown in FIG. 8B. In this case, since the two vibrator devices 10 and 11 are connected in parallel, the vibrator devices are driven by the alternating voltage of the amplitude that is half of the amplitude of the case where the two vibrator devices 10 and 11 are connected in series.

if the vibrator devices 10 and 11 belong in the same class as mentioned above, the resonance frequencies (averages of the resonance frequencies of the built-in vibrators) of the vibrator devices are approximately equal. Moreover, since the three vibrators are equally arranged around the cylindrical shaft 4, the loads of three vibrators are equalized. Accordingly, there is little load fluctuation during rotation. This reduces the difference between the vibration velocities of the vibrator devices and achieves efficient drive.

Figure 9A:
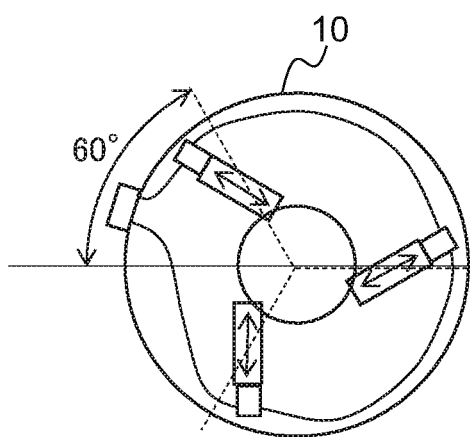
FIG. 9A and FIG. 9B are views showing attachment phases of the respective vibrator devices to the cylindrical shaft.
Figure 9B:
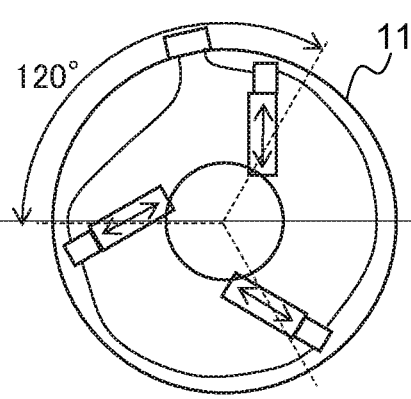

FIG. 9A and FIG. 9B are views showing attachment phases of the respective vibrator devices to the cylindrical shaft 4. The two vibrator devices are attached so that the rotation phases are shifted by 60 degrees. Since the vibrator devices 10 and 11 are equally arranged around the cylindrical shaft 4 by shifting the phases by the predetermined angle as shown in FIG. 9A and FIG. 9B, rotation of the cylindrical shaft 4 with little torque fluctuation is achieved.

The three transformers and three vibrators are installed in each of the vibrator devices 10 and 11. Accordingly, the three vibrators in each of the vibrator devices 10 and 11 are arranged every 120 degrees. When a vibrator device has two vibrators, the two vibrators are preferably arranged every 180 degrees. Moreover, when a vibrator device has four vibrators, the four vibrators are preferably arranged every 90 degrees.

Figure 10:
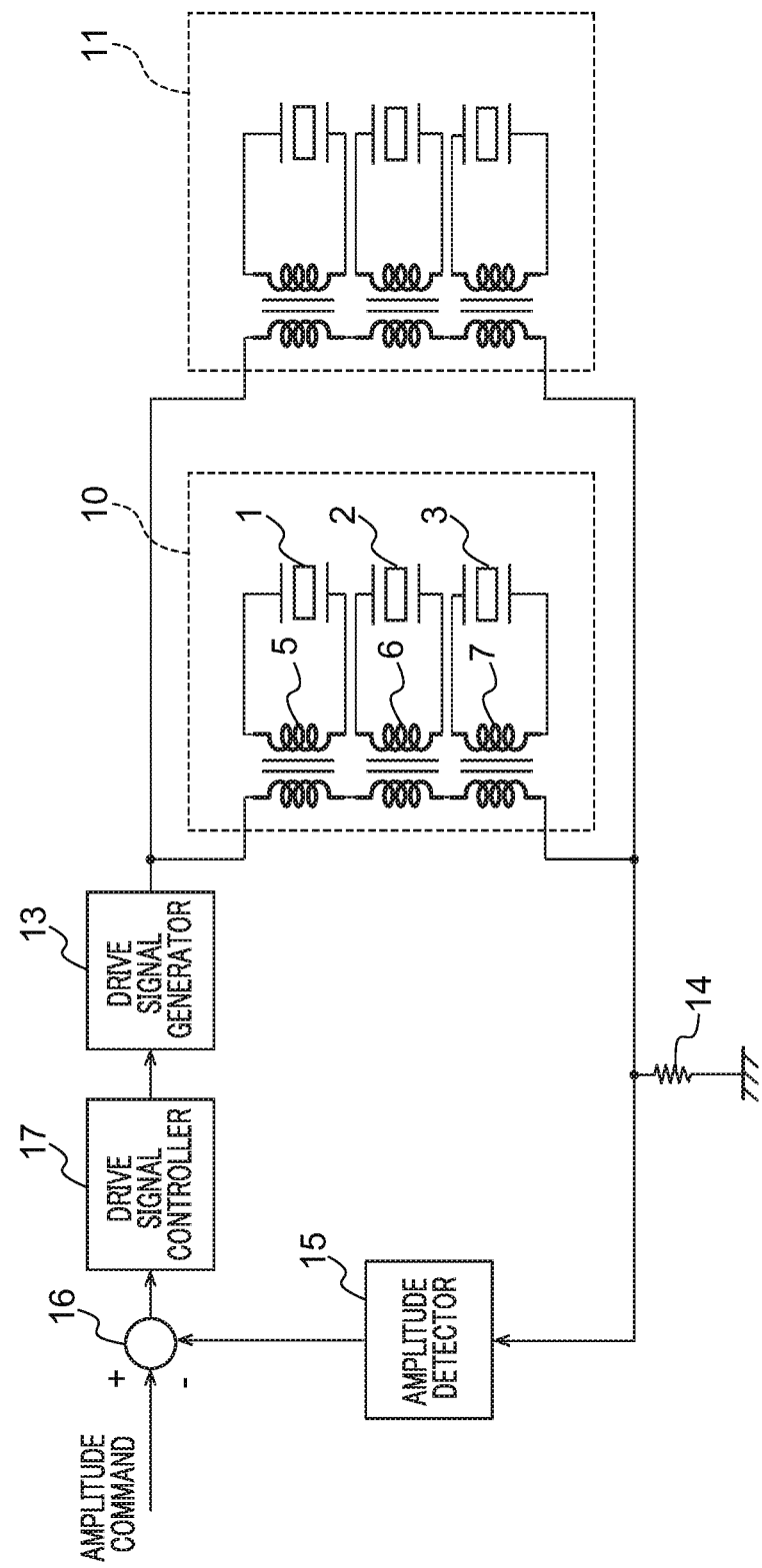
FIG. 10 is a view showing a second example of the drive circuit for the vibration actuator concerning the first embodiment.

FIG. 10 is a view showing a second example of a drive circuit for the vibration actuator that uses the vibrator device 10 concerning the first embodiment. Circuits surrounded by dotted lines in FIG. 10 are internal circuits of the vibrator devices 10 and 11. The vibrator device 10 and the vibrator device 11 have the almost same configurations and are connected in parallel as shown in FIG. 8B. The vibrator devices 10 and 11 have three transformers and three vibrators, respectively. The inductance value of the secondary coils of the transformers is matched at a predetermined frequency within the frequency range of the alternating voltage that the drive signal generator 13 outputs. That is, a relation between a matching frequency F0, the damping capacitance C0, and the inductance value L0 of the secondary coil of the transformer is represented by the formula 1 mentioned above.

The drive signal generator 13 generates the alternating voltage applied to the vibrator devices 10 and 11. The resistance 14 is used to measure the total electric current that flows through the vibrator devices 10 and 11. Since the resonance frequencies of the vibrator devices 10 and 11 are made uniform, an almost equivalent average load is applied to each of the vibrators that are equally arranged around the cylindrical shaft 4. Accordingly, the phase of inflow electric current does not deviate largely. Accordingly, the amplitude detector 15 outputs the voltage proportional to the sum of the amplitudes of electric currents that flow through the vibrator devices 10 and 11.

Then, the comparator 16 compares the sum of the amplitudes of electric currents with the amplitude command from the command unit (not shown). The drive signal controller 17 controls the frequency or amplitude of the alternating voltage that the drive signal generator 13 outputs on the basis of the comparison result.

Although the example that the plurality of vibrator devices drives the same contact member is described in this embodiment, the plurality of vibrator devices may respectively drive different contact bodies. In this case, although it is difficult to drive the contact bodies at the completely same speed, the circuit structure can be reduced because the plurality of vibrators are simultaneously driven at the similar vibration velocities.

Moreover, the vibrator devices may drive not only the cylindrical shaft of which diameter is constant, but also a contact member like a cone shaft of which diameter depends on the contact position. In this case, the peripheral speed depends on the diameter of the position at which the vibrator device contacts the contact member. Accordingly, the ratio of the vibration velocities of the vibrators of the vibrator devices is settable according to the ratio of the peripheral speeds.

A vibration velocity of a vibrator varies in proportion to a reciprocal of a winding ratio of a transformer connected in parallel to the vibrator. For example, a vibration velocity of a vibrator becomes half by changing a winding ratio of a transformer into 1:2N from 1:N. Accordingly, winding ratios of transformers included in each of vibrator devices connected in parallel or in series may be set according to a shape of a contact member. In this case, the winding ratios of all or a part of the transformers of the vibrator devices may be different from each other. Thereby, the vibrators of the vibrator devices are able to drive the contact member at proper vibration velocities depending on the shape of the contact member.

Moreover, the plurality of vibrators are installed in each vibrator device. The shape of the vibrators may be the same and may differ. When the vibrators installed in the vibrator device are different from each other, it is preferable that the resonance frequencies of the vibrators be close to each other (fall within a predetermined range). Furthermore, when the number of vibrators (vibrators that are connected in series in the equivalent circuit diagram) installed in a vibrator device exceeds a predetermined number, the vibrators may not operate normally only by the transformers in the vibrator device. In this case, the drive signal generator 13 may have a transformer that boosts the alternating voltages of the respective phases.

Figure 11:
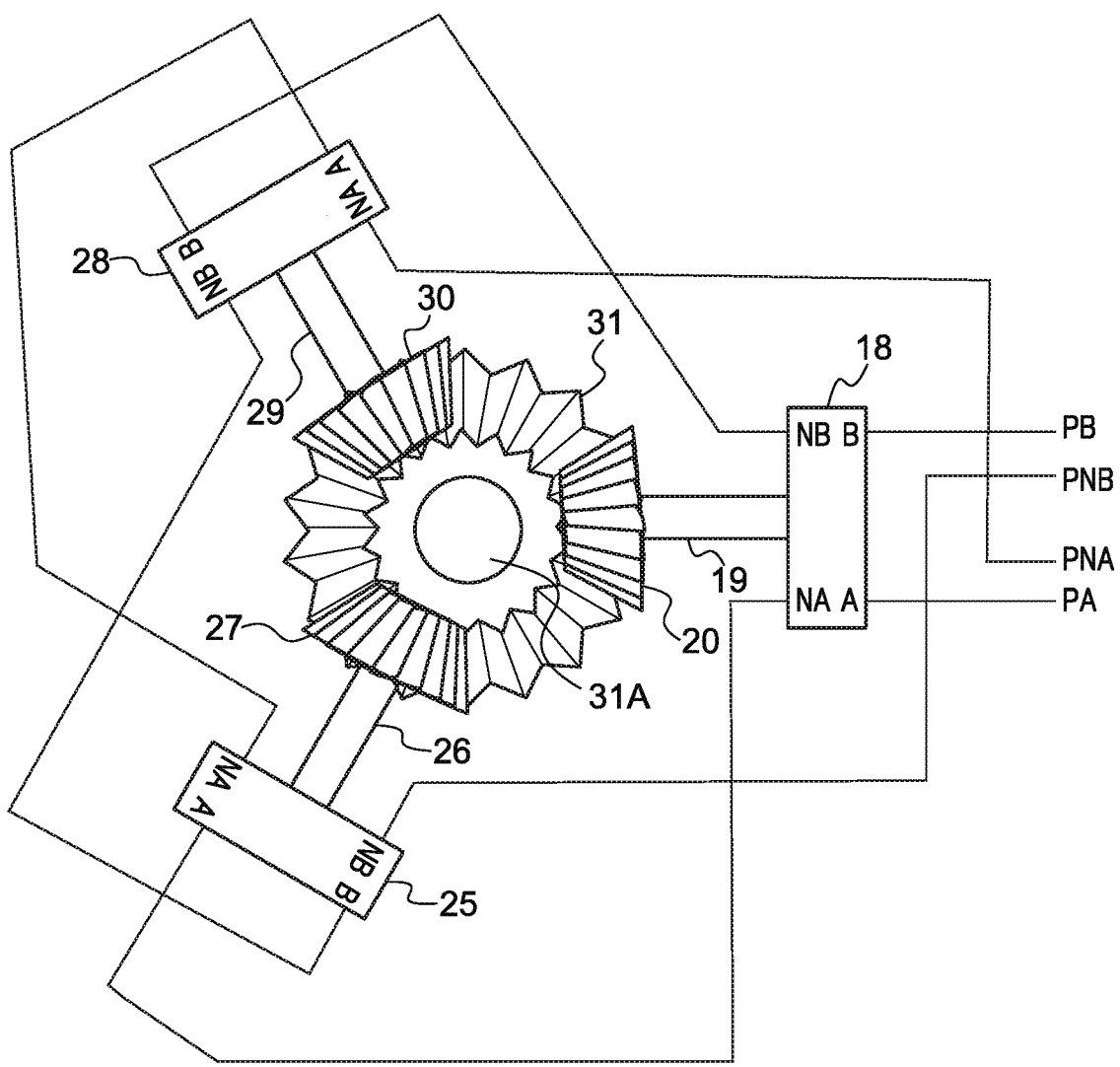
FIG. 11 is a view showing an example of a vibration actuator concerning a second embodiment.

Next, a second embodiment will be described. FIG. 11 is a view showing an example of a vibration actuator concerning the second embodiment. Each of three shaft-output vibration actuators 18, 25, and 28 has one vibrator and joins to a rotation shaft 31A using a bevel gear mechanism to rotate the rotation shaft 31A. A bevel gear 20 is attached at a front end of an output shaft 19 of the vibration actuator 18. A bevel gear 27 is attached at a front end of an output shaft 26 of the vibration actuator 25. A bevel gear 30 is attached at a front end of an output shaft 29 of the vibration actuator 28. The bevel gears 20, 27, and 30 engage with a larger bevel gear 31 attached to the rotation shaft 31A at angular intervals of 120 degrees.

The vibrators of the respective vibration actuators 20, 27, and 30 are equivalently connected in series to constitute one vibrator device. Alternating voltages of which phases are shifted by 90 degrees are applied to drive voltage lines of phases A, B, NA, and NB. Thereby, vibrations are excited and the bevel gear 31 connected indirectly is driven.

Figure 12:
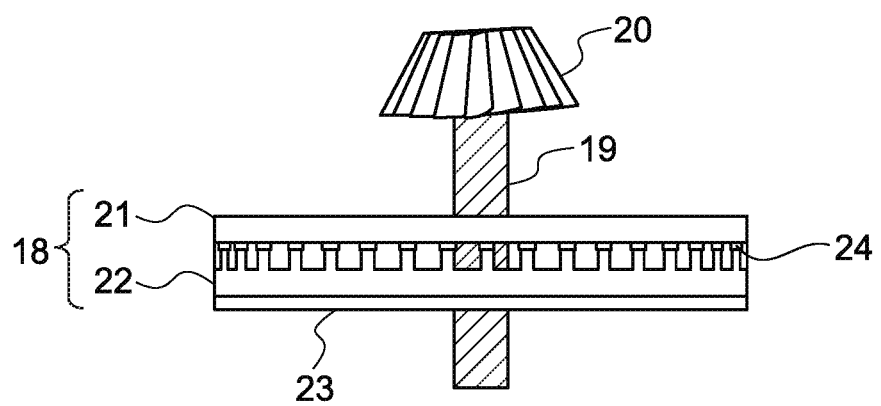
FIG. 12 is a view showing a configuration of the vibration actuator concerning the second embodiment.

FIG. 12 is a view showing a configuration of the vibration actuator 18 concerning the second embodiment. The vibration actuator 18 has a rotor 21, an elastic member body 22, a piezoelectric member 23, and a friction member 24. The output shaft 19 is joined to the center of the rotor 21. The output shaft 19 and rotor 21 are supported rotatably. The elastic body 22 is a conductive member that has a comb-like projection structure. The piezoelectric member 23 is adhered to the elastic body 22. Moreover, the friction member 24 is adhered on the upper portion of the projection structure of the elastic body 22. The material of the friction member 24 is selected so that a contact portion to the rotor 21 slowly and stably wears out.

Figure 13:
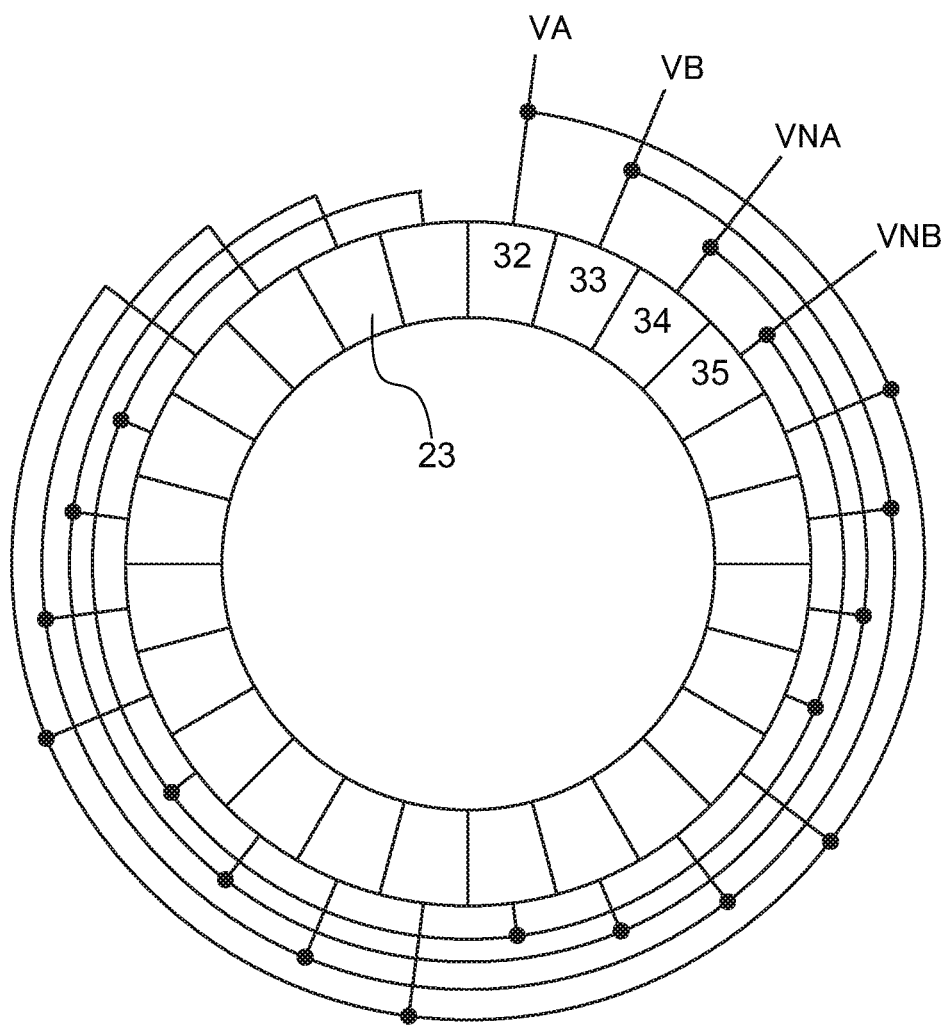
FIG. 13 is a view showing an electrode structure of a circular piezoelectric member.
Figure 14:
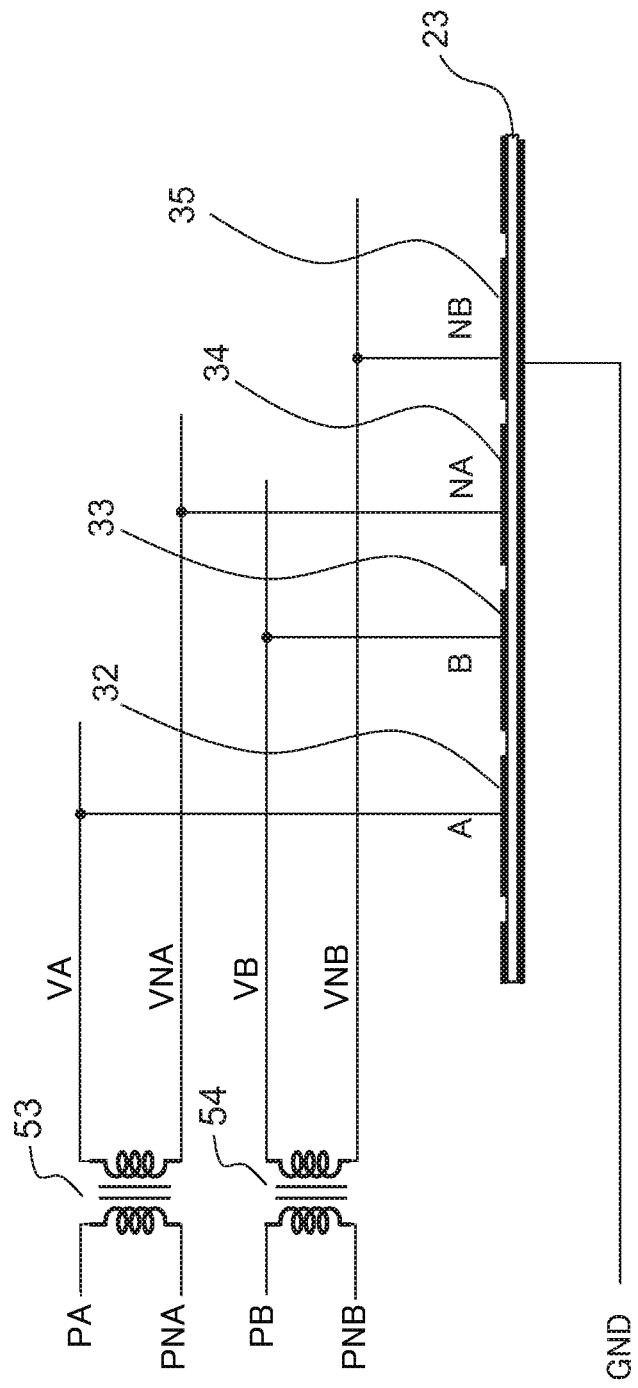
FIG. 14 is a view showing an interconnection structure of the piezoelectric member.

FIG. 13 is a view showing an electrode structure of the circular piezoelectric member 23. FIG. 13 shows a connection state between electrodes 32, 33, 34, and 35 of the piezoelectric member 23 on its front surface and the drive voltage lines of the phases A, B, NA, and NB. FIG. 14 is a side view showing the wiring structure of the piezoelectric member 23. One electrode covers the entire back surface of the piezoelectric member 23. Electrodes of the phases A and NA of the piezoelectric device 23 are connected to a secondary side of a transformer 53, and electrodes of the phases B and NB are connected to a secondary side of a transformer 54. Alternating voltages PA and PNA are supplied to a primary side of the transformer 53, and alternating voltages PB and PNB are supplied to a primary side of the transformer 54. The alternating voltages PA and PNA have the phase difference of 180 degrees and the alternating voltages PB and PNB have the phase difference of 180 degrees. Although the transformers 53 and 54 are not provided with a center tap at the secondary side, the circuit configuration provides a center tap that is connected to GND.

The piezoelectric member of the vibration actuator 18 is connected to the transformers 53 and 54 as shown in FIG. 14. The vibration actuators 25 and 28 are also connected similarly. Moreover, the primary coils of the transformers of the vibration actuators 18, 25, and 28 are connected in series for every phase. Furthermore, each of the vibration actuators has four vibration sections of the phases A, B, NA, and NB that are different every 90 degrees. The vibration sections are classified to section groups and are connected to the secondary coils of the transformers for every section group. The phases of the vibration sections in each of the section group are different by 180 degrees. Since the vibration sections are included in one vibration actuator that has almost the uniform characteristic, two vibration sections of opposite phases are connected in series and a value of an inductor of a secondary coil of a transformer is set while treating the two vibration sections connected as one vibrator (one section group). Since the two vibration sections are connected in series, the value of the inductor of the secondary coil of the transformer is found by the frequency matching calculation of the formula 1 using a value that is one half of the total amount of damping capacities of the respective phases.

Figure 15:
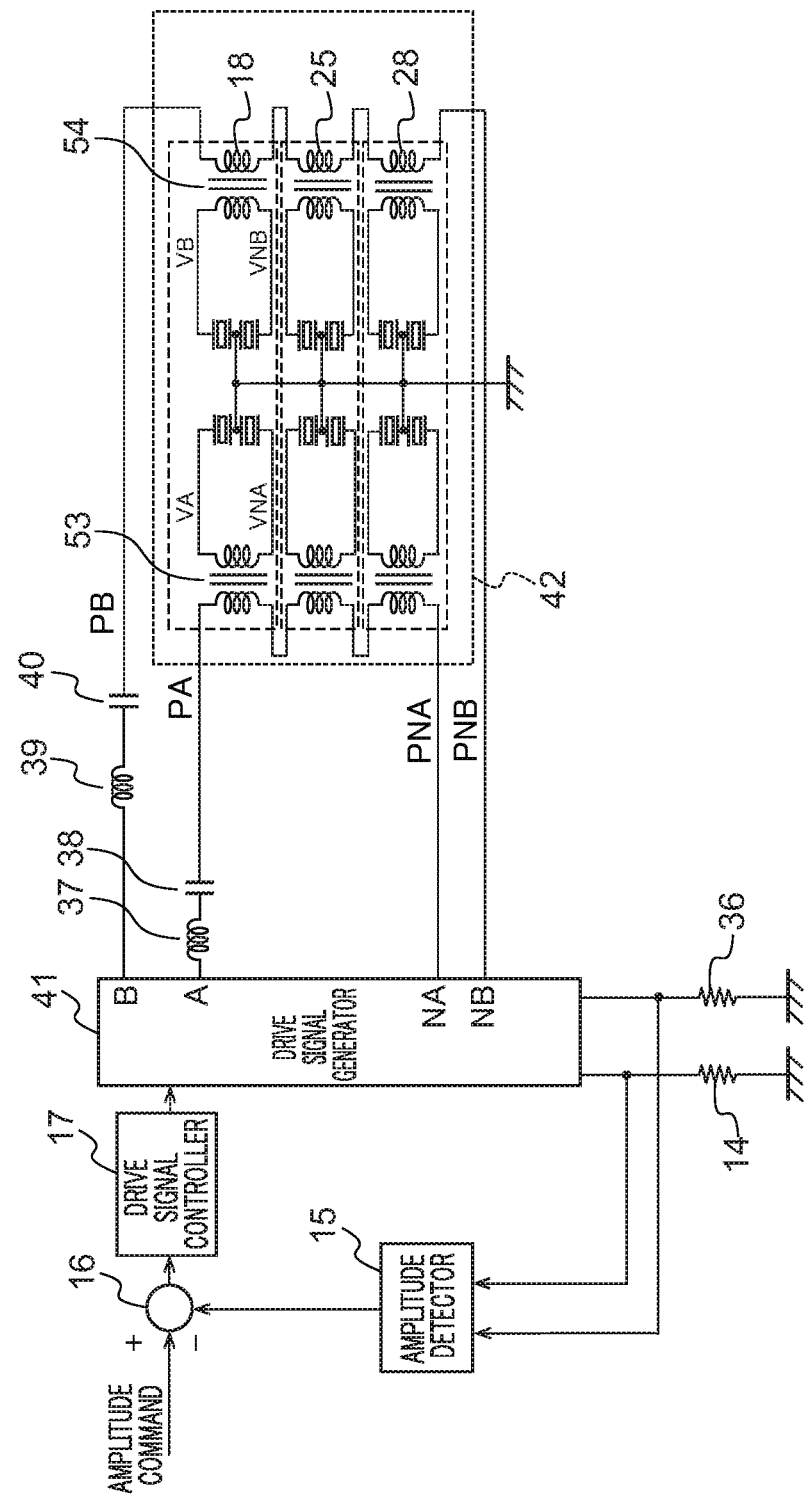
FIG. 15 is a view showing a first example of a drive circuit for the vibration actuator concerning the second embodiment.

In the example of FIG. 15, the three vibration actuators 18, 25, and 28 are connected in series and constitute one vibration actuator 42 into which the alternating voltages PA, PB, PNA, and PNB are input as a whole. An area surrounded with a broken line indicates each vibration actuator 18, 25, and 28. An area surrounded by a dotted line indicates the vibration actuator 42.

H-bridge circuits (power amplification circuits, not shown) are respectively connected between the terminals A and NA and between the terminals B and NB of the drive signal generator 41. Waveforms of pulse drive voltages that the H-bridge circuits output are shaped by series resonant circuits constituted by inductors 37 and 39 and capacitors 38 and 40 that are inserted between the vibration actuators 42 and the drive signal generator 41. Then, the pulsed drive voltages of which waveforms have been shaped are applied to the vibration actuator 42. The series resonant circuits constituted by the inductors 37 and 39 and the capacitors 38 and 40 are subjected to matching adjustment at a predetermined frequency within a driving frequency range of the vibration actuator 42. This suppresses large fluctuation of the drive voltage amplitude of the vibration actuator 42 within the driving frequency range.

Resistances 14 and 36 for current measurement are respectively connected to terminals for electric current detection of the H-bridge circuits of the drive signal generator 41. The resistances 14 and 36 are measuring the electric currents corresponding to the vibration velocities of the vibrators included in the vibration actuator 42. The amplitude detector 15 detects the vibration velocities of the vibrators on the basis of the measurement values of the resistances 14 and 36. The comparator 16 compares the vibration amplitude command from the vibration amplitude command unit (not shown) with the detection results (amplitude of vibration velocities of the vibrators) of the amplitude detector 15. The drive signal controller 17 outputs at least one of command about the frequency, pulse width, and voltage amplitude to the drive signal generator 41 according to the comparison result.

Generally, a vibration actuator has irregularity or fluctuation in a resonance frequency or an internal loss under the influence of manufacture irregularity of a friction member or pressure irregularity owing to plane accuracy of a vibrator. In addition, since there are variation depending on a rotation angle and variation with time resulting from progress of wear, it is difficult to make vibration characteristics of a plurality of vibration actuators uniform. However, the above-mentioned configuration employed in this embodiment makes the amplitude characteristics of the vibrators uniform, allows to transmit the comparatively equal force to the bevel gear 31, and enables the efficient drive with little wear of the gears.

Although the vibration actuator 42 does not include the inductors 37 and 39, the inductors 37 and 39, and the capacitors 38 and 40 in the example in FIG. 15, some or all of these components may be included in the vibration actuator 42. Since the vibration actuator 42 includes the components that are subjected to the frequency matching in accordance with the inherent resonance frequency, adjustment at the time of using the vibration actuator 42 becomes unnecessary. This reduces variation in performance and improves convenience of the user who uses the vibration actuator 42.

Although the series resonant circuit consisting of the inductor 37 and the capacitor 38 is connected in the example of FIG. 15, only one of them may be connected to the vibration actuator 42. Similarly, one of the inductor 39 and the capacitor 40 may be connected to the vibration actuator 42. A capacitor is used to intercept direct current and an inductor has an effect to smooth a waveform.

Moreover, in this embodiment, the entire configuration including the three vibration actuators 18, 25, and 28 that are connected in series and are united by the bevel gear 31 is described as the one vibration actuator 42. Assuming that the vibration actuator 42 consisting of the three vibration actuators 18, 25, and 28 is one vibrator device, a configuration in which the vibrator devices are connected in series or in parallel can be also employed. Thereby, a high-output vibration actuator is constituted. In this case, it is preferable that the vibrators be selected so that the averages of the resonance frequencies of the vibrators of the vibrator devices will be approximately equal to each other.

Moreover, the above-mentioned vibrator devices may be mechanically combined by connecting a plurality of complex vibration actuators as shown in FIG. 11 in a state where a plurality of gears equivalent to the bevel gear 31 are fixed to the same rotation shaft 31A. Alternatively, the vibrator devices may be combined through other gears.

Moreover, the three vibration actuators 18, 25, and 28 connected in series included in the vibrator device may drive different contact members instead of one shaft (contact member) in the second embodiment. For example, when a plurality of dolls, which are contact members that are not necessary to move synchronously, decorated in a show window are driven, a plurality of vibration actuators are applicable to drive the dolls. This case is effective because the plurality of vibration actuators are stably driven at an appropriate velocity.

For example, different dolls can be attached instead of the bevel gears 20, 27, and 30 in FIG. 11. In this case, three dolls can be rotated at the almost same velocity by connecting the three vibration actuators in series equivalently. Moreover, the three dolls can be rotated at different rotational speeds by changing the winding ratios of the transformers of the three vibration actuators 18, 25, and 28. For example, when the winding ratios of the three vibration actuators 18, 25, and 28 are set so as to be proportional to the reciprocals of the ratio of the rotational velocities of three dolls, the ratio of the rotational velocities of the three dolls can be arbitrarily set up.

Figure 16A:
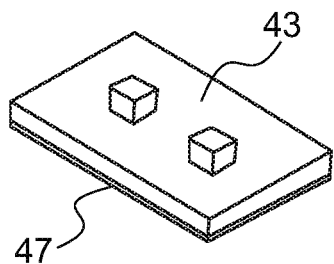
FIG. 16A through FIG. 16D are views showing a configuration and vibration modes of a vibrator device concerning a third embodiment.

Next, a third embodiment will be described. FIG. 16A through FIG. 16D are views showing a configuration and vibration modes of a vibrator concerning the third embodiment. FIG. 16A shows the configuration of the vibrator. The vibrator 43 has a plate shape and is manufactured from conductive material. Two projections that contact a contact member are provided in the surface of the vibrator 43. A piezoelectric member 47 constitutes a part of the vibrator 43 and vibrates the vibrator 43.

Figure 16B:
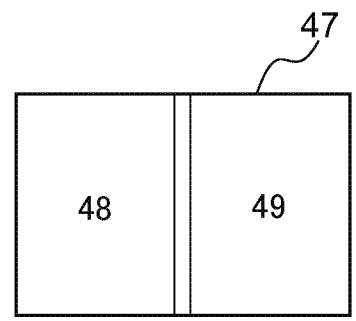

FIG. 16B shows electrodes provided in the piezoelectric member 47. The electrodes 48 and 49 are electrically insulated. Two alternating voltages of which phases vary independently are respectively applied to the electrode 48 and the electrode 49. The entire back surface of the piezoelectric member 47 is formed as an electrode. The piezoelectric member 47 is configured so that the back-surface electrode can be energized from the front surface through via holes (not shown) provided in parts of the electrodes 48 and 49.

Figure 16C:
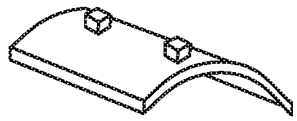
Figure 16D:
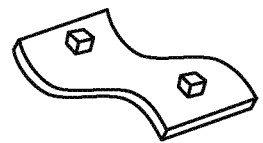

FIG. 16C shows a vibration form in a vibration mode excited when alternating voltages of the same phase are applied to the electrodes 48 and 49. FIG. 16D shows a vibration form of the vibration mode excited when alternating voltages of opposite phases are applied to the electrodes 48 and 49. When the phase difference between the alternating voltages applied to the electrodes 48 and the electrode 49 is 0 degrees, the vibration mode of FIG. 16C is excited. When the phase difference between the alternating voltages applied to the electrodes 48 and the electrode 49 is 180 degrees, the vibration mode of FIG. 16D is excited. Moreover, when the phase difference of alternating voltages is an angle between 0 degrees and 180 degrees, both the vibration modes are excited simultaneously.

The phase difference of alternating voltages is an angle between 0 degrees and 120 degrees in many cases. Then, a contact member that presses the projections provided in the vibrator 43 moves. When the contact member is a rectangular parallelepiped, the contact member that presses the projections provided in the vibrator 43 moves in a rectangular longitudinal direction.

Figure 17:
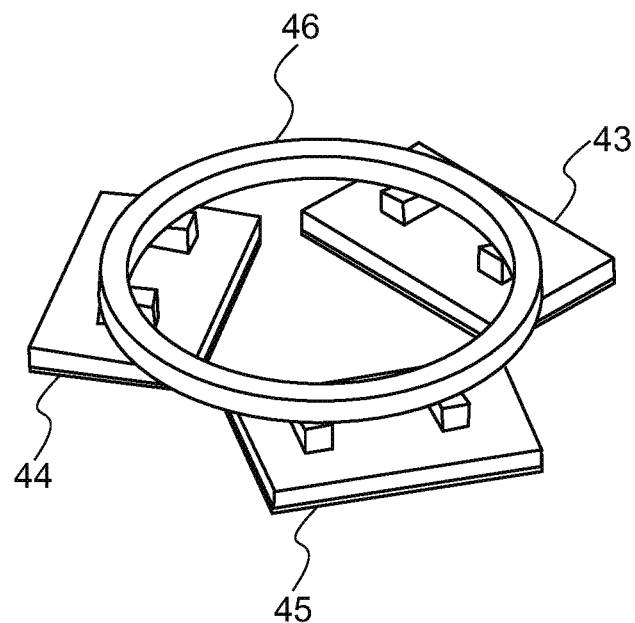
FIG. 17 is a view showing an example of a vibration actuator concerning the third embodiment.

FIG. 17 is a view showing an example of a vibration actuator concerning the third embodiment. As shown in FIG. 17, three vibrators 43, 44, and 45 are equally arranged along a circular contact member 46. The circular contact member 46 is rotatably held by a support member (not shown). The contact member 46 can be rotated because the three vibrators 43, 44, and 45 excite vibration.

Figure 18:
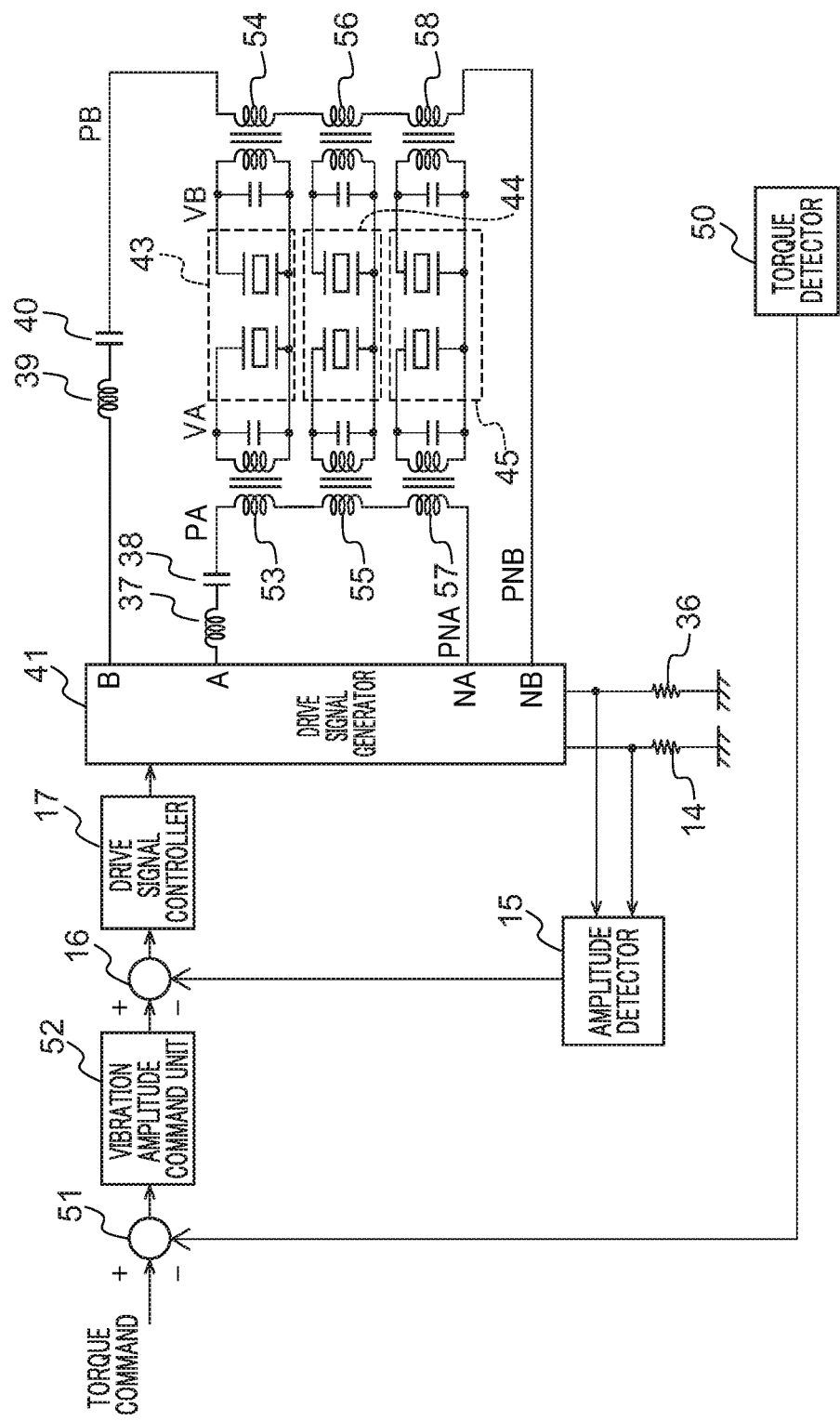
FIG. 18 is a view showing a first example of a drive circuit for the vibration actuator concerning the third embodiment.

FIG. 18 is a view showing an example of a drive circuit for the vibration actuator concerning the third embodiment. In the vibrator 43, the secondary coil of the transformer 53 is connected in parallel to the A phase side, and the secondary coil of the transformer 54 is connected in parallel to the B phase side. A capacitor for fine adjustment of frequency matching is connected in parallel between each of the transformers 53 and 54 and the vibrator 43. The vibrators 44 and 45 also have the same configuration as the vibrator 43. The primary coils of the transformers are connected in series for every phase. That is, the primary coils of the transformers 53, 55, and 57 at the A phase side are connected in series.

Moreover, the primary coils of the transformers 54, 56, and 58 at the B phase side are connected in series. Both ends of the transformers 53, 55, and 57 that are connected in series are connected to H-bridges of the drive signal generator 41 through a series resonant circuit constituted by an inductor 37 and a capacitor 38. Moreover, both ends of the transformers 54, 56, and 58 that are connected in series are connected to H-bridges of the drive signal generator 41 through a series resonant circuit constituted by an inductor 39 and a capacitor 40. A series resonant circuit may include one of the inductor and capacitor or may include both.

The drive signal generator 41 outputs pulse signals of four phases that differ every 90 degrees. The drive circuit for the vibration actuator shown in FIG. 18 has a torque detector 50. The torque detector 50 detects the torque applied to the contact member 46. The torque detector 50 outputs the detected torque to the comparator 51. The comparator 51 compares the torque detected by the torque detector 50 with a torque command from the command unit (not shown) and outputs a comparison result to a vibration amplitude command unit 52. The vibration amplitude command unit 52 controls the vibration amplitudes of the vibrators 43, 44, and 45 according to the comparison result that the comparator 51 outputs.

Resistances 14 and 36 for current measurement are respectively connected to source terminals for electric current detection of the H-bridge circuits of the drive signal generator 41. The resistances 14 and 36 output the electric currents corresponding to the vibration velocities of the vibrators 43, 44, and 45. The amplitude detector 15 detects the vibration amplitudes from the detection results of the electric currents. The comparator 16 compares the detected vibration amplitude with the vibration amplitude command that the vibration amplitude command unit 52 outputs, and outputs a comparison result to the drive signal generator 41. The drive signal controller 17 controls at least one of the frequencies, pulse width, and voltage amplitude of the pulse signals that the drive signal generator 41 generates according to the comparison result.

For example, when the torque applied to the contact member 46 is smaller than a target value, the frequency of the alternating voltage that the drive signal generator 41 outputs approaches the resonance frequency of the vibrators 43-45, and the vibration amplitudes of the vibrators 43-45 increase. Thereby, the torque applied to the contact member 46 increases. Moreover, a configuration in which the torque detector 50 is replaced with a speed detector that detects the speed of the contact member 46 and the comparator 51 compares the detected speed with the speed command from a command unit (not shown) may be employed. Thereby, the moving speed of the contact member 46 is controllable.

Figure 19A:
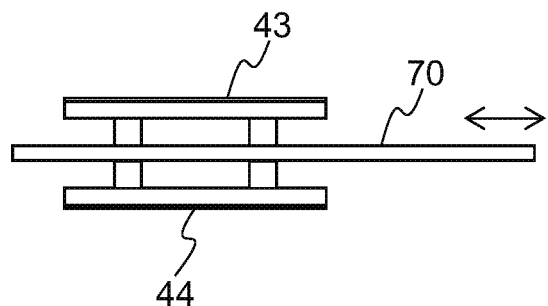
FIG. 19A and FIG. 19B are views showing a first example of a linear-motion vibration actuator concerning the third embodiment.
Figure 19B:
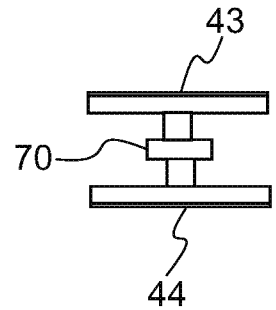

FIG. 19A and FIG. 19B are views showing a first example of a linear-motion vibration actuator of the third embodiment. FIG. 19A is a figure viewed from a direction that intersects perpendicularly with a moving direction of a contact member 70. Projections of the two vibrators 43 and 44 are arranged face to face mutually and are configured so that the contact member 70 will move in a direction of an arrow in FIG. 19A in a state where the projections put the contact member 70 therebetween from the vertical direction. FIG. 19B is a figure viewed from the moving direction of the contact member 70. The vibrators 43 and 44 are arranged symmetrically in the vertical direction (are arranged equally at angular intervals of 180 degrees on the circumference) with respect to the contact member 70.

Figure 20A:
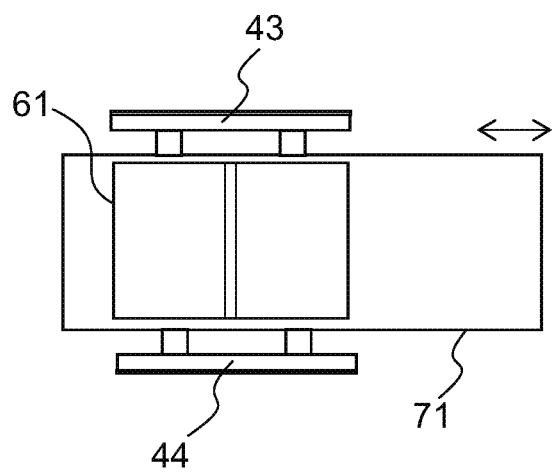
FIG. 20A and FIG. 20B are views showing a first example of a linear-motion vibration actuator of the third embodiment.
Figure 20B:
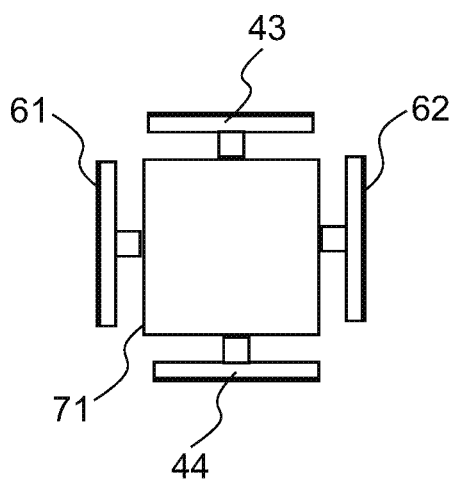

FIG. 20A and FIG. 20B are views showing a second example of a linear-motion vibration actuator of the third embodiment. As shown in FIG. 20A and FIG. 20B, a contact body is a prism having a square section, and projections of vibrators press four surfaces of the prism contact member. FIG. 20A is a figure viewed from a direction that intersects perpendicularly with a moving direction of the contact member 71. FIG. 20B is a figure viewed from the moving direction of the contact member 71. As shown in FIG. 20A and FIG. 20B, four vibrators 43 44, 61, and 62 are equally arranged around the contact member 71 that is a prism having a square section at angular intervals of 90 degrees on the circumference. Each of the vibrators 43, 44, 61, and 62 is provided with two electrodes (not shown). The electrodes of the vibrators 43, 44, 61, and 62 are equivalently connected in series through a transformer for every phase of the alternating voltage applied. A transformer is connected in parallel to each vibrator as with the vibrators 43, 44, and 45 in FIG. 18.

Although the contact member in FIG. 20A and FIG. 20B is the prism having a square section, the contact member may be a cylinder having a circular section. Moreover, FIG. 20A and FIG. 20B show the example that employs the four vibrators, which are equivalently connected in series through the transformers, as one vibrator device. A configuration in which two vibrator devices each of which is constituted by two vibrators that are opposite to each other are connected in series or in parallel may be employed. Moreover, a configuration in which a plurality of vibrator devices each of which is constituted by the four vibrators of FIG. 20A and FIG. 20B are arranged along the moving direction of the contact member 71 and are connected in parallel or in series may be employed. Furthermore, the vibrators may respectively drive different contact members. Moreover, the vibrators may be classified into groups of a predetermined number, and different contact member may be driven for every group.

Figure 21:
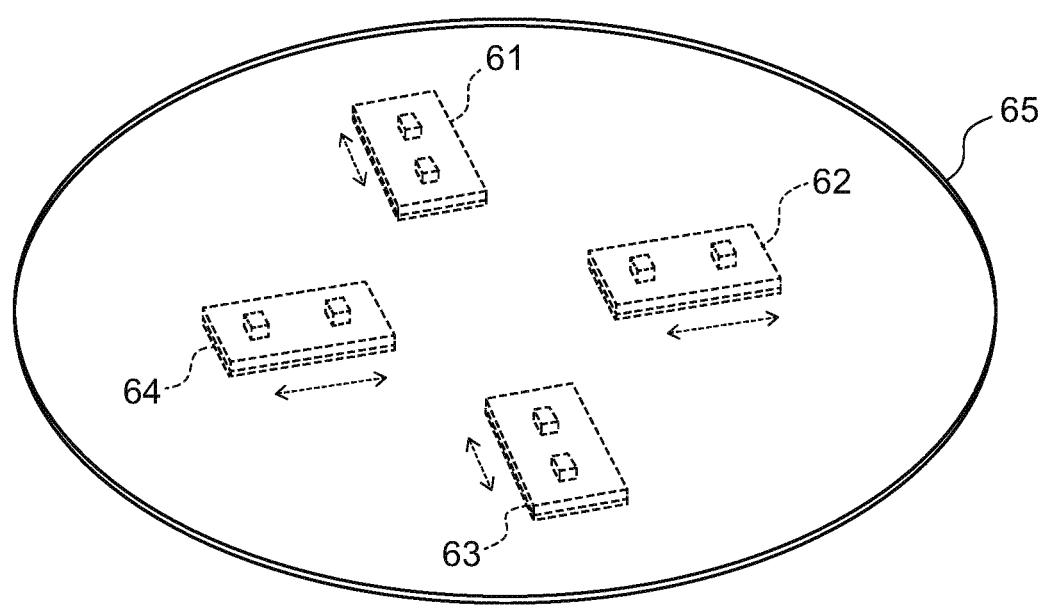
FIG. 21 is a view showing a first example of a vibration actuator concerning a fourth embodiment.

Next, a fourth embodiment will be described. FIG. 21 is a view showing a first example of a vibration actuator concerning the fourth embodiment. As shown in FIG. 21, two vibrators 61 and 63 and two vibrators 62 and 64 respectively constitute vibrator devices. The vibrators 61 and 63 constitute a Y-axis vibrator device that drives a contact member 65 in a Y-axis direction. The vibrators 61 and 63 are equivalently connected in series through transformers. The vibrators 62 and 64 constitute an X-axis vibrator device that drives a contact member 65 in an X-axis direction. The vibrators 62 and 64 are equivalently connected in series through transformers. The resonance frequency of the X-axis vibrator device is fully apart from the resonance frequency of the Y-axis vibrator device so as not to affect mutually. And the shapes of the vibrators are adjusted so that the driving frequency ranges may not overlap.

Figure 22:
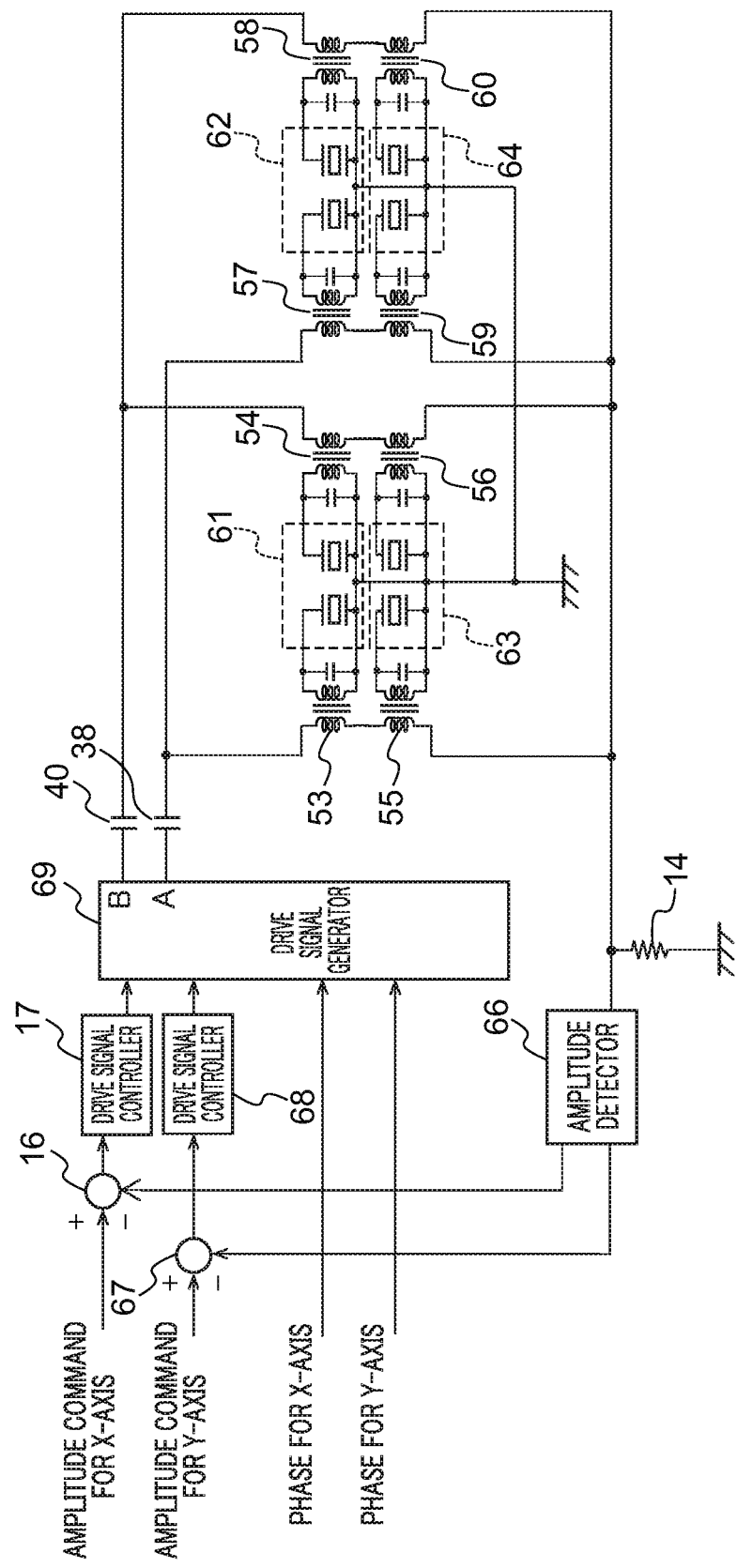
FIG. 22 is a view showing a first example of a drive circuit for the vibration actuator concerning the fourth embodiment.

FIG. 22 is a view showing a first example of a drive circuit for the vibration actuator concerning the fourth embodiment. The vibrators 62 and 64 of the X-axis vibrator device and the vibrators 61 and 63 of the Y-axis vibrator device are connected in series for each phase through transformers. Moreover, a capacitor is connected in parallel to each vibrator. The values of the inductance of the secondary coil, the value of the capacitor, and the damping capacitance of each vibrator of the Y-axis vibrator device are subjected to the frequency matching to a frequency Fy for a Y-axis. The values of the X-axis vibrator device are subjected to the frequency matching of a frequency Fx for an X-axis.

Figure 23:
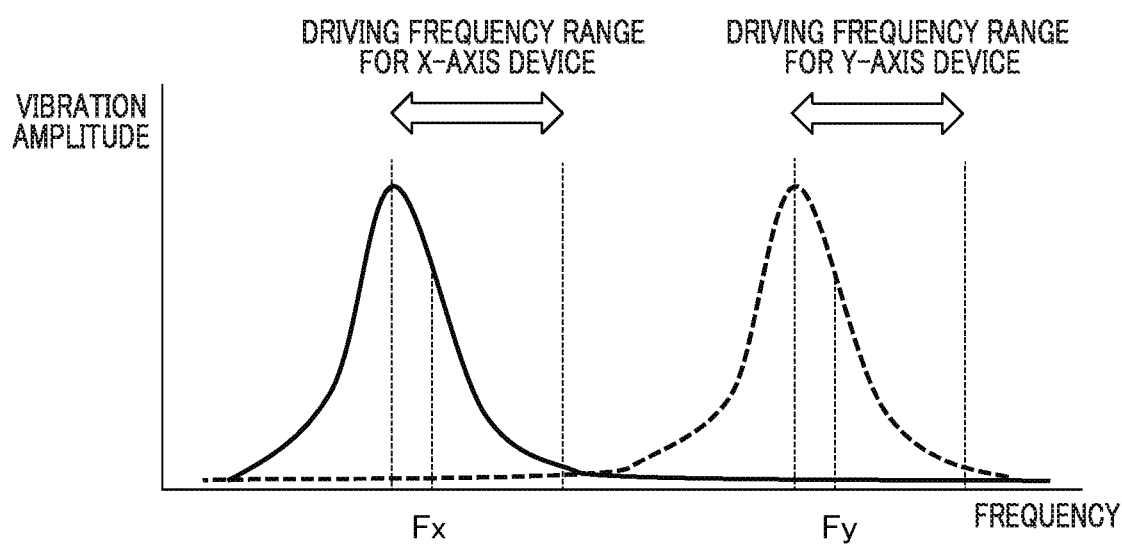
FIG. 23 is a graph showing electric current amplitude characteristics of the vibrator devices in the fourth embodiment.

FIG. 23 is a graph showing electric current amplitude characteristics of the vibrator devices in the fourth embodiment. A solid line shows the vibration characteristic of the X-axis vibrator device, and a broken line shows the vibration characteristic of the Y-axis vibrator device. As shown in FIG. 23, a driving frequency range about the X-axis vibrator device is set at the higher side of the maximum-amplitude frequency. Then, the frequency Fx for the X-axis is set within the driving frequency range. Similarly, a driving frequency range about the Y-axis vibrator device is set at the higher side of the maximum-amplitude frequency. Then, the frequency Fy for the Y-axis is set within the driving frequency range.

The drive signal generator 69 composites the alternating voltages of two frequency regions that respectively include the frequency Fx for the X-axis and the frequency Fy for the Y-axis. Then, the drive signal generator 69 generates the alternating voltage of two phases in each frequency region. The capacitors 38 and 40 are inserted between the drive signal generator 69 and the respective vibrator devices. Thereby, a direct current is intercepted.

As shown in FIG. 22, the drive circuit for the vibration actuator has an amplitude detector 66. The sum signal of the electric currents of two phases that flow according to the vibration velocities of the vibrators detected with the resistance 14 for electric current detection is input into the amplitude detector 66. The amplitude detector 66 detects a vibration amplitude on the basis of the input sum signal for every frequency range of the driving frequency range for the X-axis and the driving frequency range for the Y-axis.

Comparators 16 and 67 respectively compare a vibration amplitude command for the X-axis and a vibration amplitude command for the Y-axis from a command unit (not shown) with the detected vibration amplitudes, and output comparison results to the drive signal controllers 17 and 68. Drive signal controllers 17 and 68 respectively control the frequencies of the alternating voltages applied to the X-axis vibrator device and Y-axis vibrator device on the basis of the comparison results.

Moreover, the command unit monitors position signals output from a two-dimensional position detector (not shown) that detects a two-dimensional position of the contact member 65, and compares them with target positions in the respective axes. Then, the command unit switches the phases of the alternating voltages applied to the X-axis vibrator device and Y-axis vibrator device to 90 degrees or −90 degrees according to signs (+/−) of the comparison results and sets up a vibration amplitude command for the X-axis and a vibration amplitude command for the Y-axis according to the absolute values of the comparison results. As a method of separating the signals in the two frequency ranges, there are a method of separating the signals with a filter, a method of finding frequencies and amplitudes by the FFT computation, and a method of performing synchronous detection of the synchronizing signal that the drive signal generator 69 generates.

Moreover, when the respective vibration velocities of the X-axis vibrator device and Y-axis vibrator device are detected from the sum signal of the electric currents, an error occurs in measurement of the amplitudes if the frequencies are merely separated. In view of this problem, an offset value for an amplitude for every frequency obtained beforehand is stored in the amplitude detector 66. This enables detection of a vibration velocity at high accuracy by performing a correction calculation based on the offset value to the obtained information about the amplitude and frequency.

Figure 24:
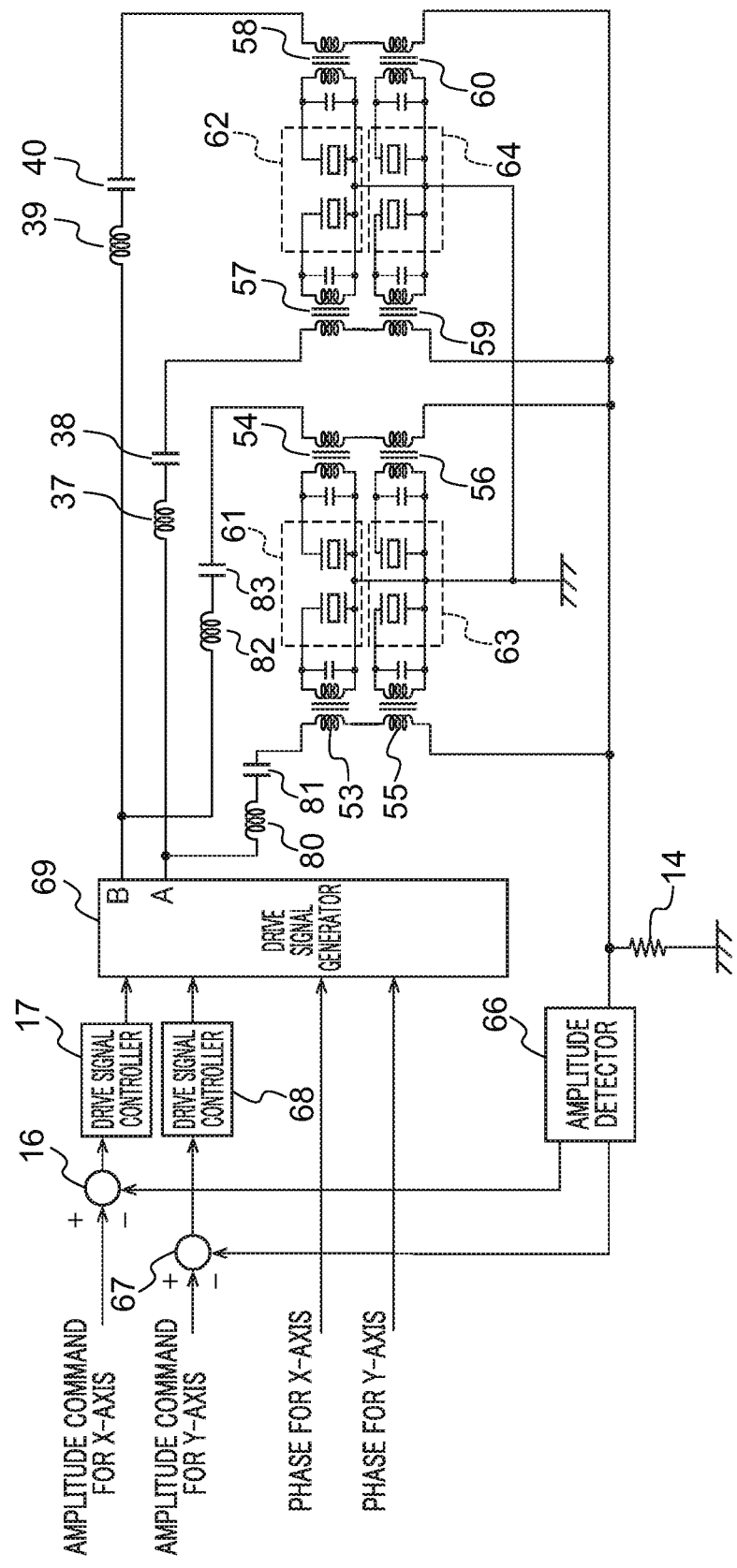
FIG. 24 is a view showing a second example of the drive circuit for the vibration actuator concerning the fourth embodiment.

FIG. 24 is a view showing a second example of a drive circuit for the vibration actuator concerning the fourth embodiment. A series circuit that consists of an inductor and a capacitor that are subjected to frequency matching at a predetermined frequency within a driving frequency range is inserted between each transformer and the drive signal generator 69 for each of the vibrator devices for different driving frequency ranges. When the series circuit consisting of the inductor and capacitor is inserted, waveform distortion of the voltage applied to each vibrator device is reduced.

Figure 25:
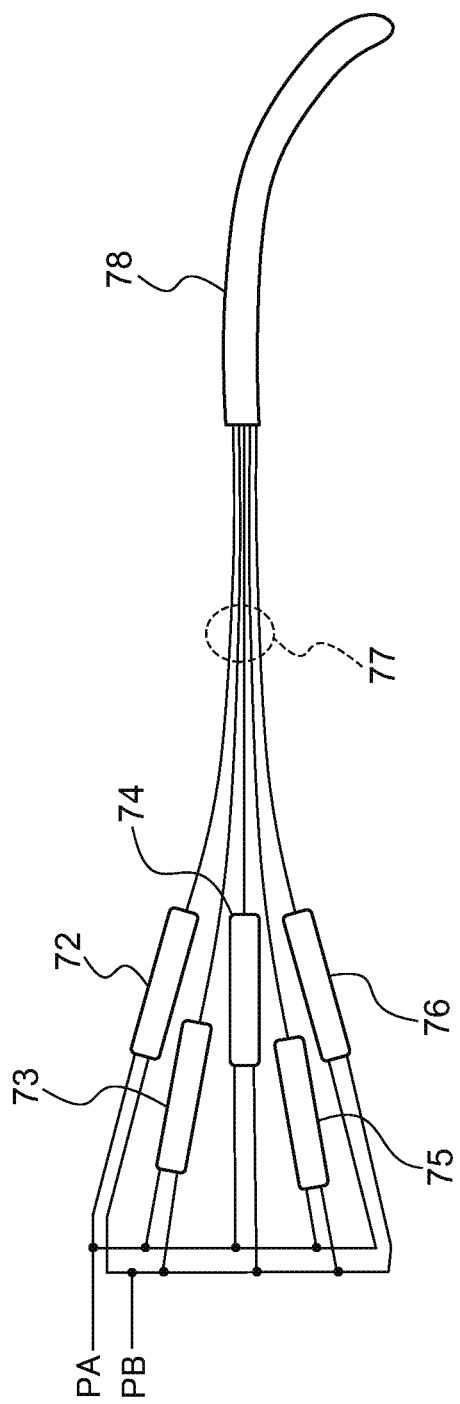
FIG. 25 is a view showing a second example of the vibration actuator concerning the fourth embodiment.

FIG. 25 is a view showing a second example of the vibration actuator concerning the fourth embodiment. As shown in FIG. 25, vibrator devices 72, 73, 74, 75, and 76 have a plurality of vibrators and a plurality of transformers. The vibrators are respectively connected to secondary coils of the transformers, and the primary coils of the transformers are connected in series.

Accordingly, the vibrators are equivalently connected in series as mentioned above. The vibrator devices 72, 73, 74, 75, and 76 are constituted by having the vibrators of which driving frequency ranges do not overlap, respectively. The vibrator devices 72, 73, 74, 75, and 76 are electrically connected in parallel and are driven by two-phase alternating voltages PA and PB. Each of the vibrator devices 72, 73, 74, 75, and 76 nips a linear-motion contact member with a plurality of vibrators that are electrically connected in series as with the examples shown in FIG. 19A, FIG. 19B, FIG. 20A and FIG. 20B. And a wire bundle 77 is combined with the contact members.

The wire bundle 77 is engaged with a tube-shaped bending driver 78 that imitates a finger. The bending driver 78 is constituted so as to bend and stretch a plurality of pseudo joints by pulling and pressing wires of the wire bundle 77. One wire of the wire bundle 77 corresponds to each of the vibrator devices 72, 73, 74, 75, and 76. The bending driver 78 can be driven by linearly moving the contact members included in the vibrator devices 72, 73, 74, 75, and 76 as if a finger bends and stretches. Accordingly, since a plurality of wires are driven even if the number of wiring lines is small, it is effective in the driving of a complicated robot hand having a plurality of joints. When the vibration actuator of this embodiment is applied to the mechanism that moves a plurality of different parts like a robot hand, thrusts required to the respective vibrator devices may differ. In such a case, the winding ratios of the transformers connected to the respective vibrators may be set to different values so as to obtain the required thrust.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-084357, filed Apr. 25, 2019, which is hereby incorporated by reference herein in its entirety.

What is claimed is:

1. A vibration actuator comprising:
a vibrator device; and
a contact member that moves relative to the vibrator device,
wherein the vibrator device comprises:
transformers of which primary coils are connected in series, and
vibrators that are respectively connected in parallel to secondary coils of the transformers, and
wherein the vibrators are arranged so as to drive the contact member to rotate or move linearly.

2. The vibration actuator according to claim 1, wherein a capacitor is connected in parallel to each of the vibrators.

3. The vibration actuator according to claim 1, wherein the vibrators are arranged around the contact member at approximately equal intervals and press the contact member.

4. The vibration actuator according to claim 1, wherein an inductance value of the secondary coils of the transformers is matched at a frequency within a predetermined range from a resonance frequency of the vibrator device.

5. The vibration actuator according to claim 4, wherein an average of the resonance frequencies of the vibrators falls within a predetermined frequency range.

6. The vibration actuator according to claim 4, wherein dispersion of the resonance frequencies of the vibrators falls within a predetermined dispersion range.

7. The vibration actuator according to claim 1, wherein a winding ratio of at least one of the transformers is different from a winding ratio of another transformer.

8. The vibration actuator according to claim 1, further comprising at least one other vibrator device, and wherein the vibrator devices are connected in parallel.

9. The vibration actuator according to claim 8, wherein winding ratios of the transformers of at least one of the vibrator devices are different.

10. The vibration actuator according to claim 8, wherein driving frequency ranges of the vibrator devices do not overlap.

11. The vibration actuator according to claim 1, wherein the vibrator device has vibrators each of which has vibration sections that are different in a phase of input alternating voltage, and wherein the vibration sections of the vibrators are connected to the secondary coils of the transformers for every phase.

12. The vibration actuator according to claim 11, wherein the vibration sections are classified to section groups of which phases are different by 180 degrees and are connected to the secondary coils of the transformers for every section group.

13. The vibration actuator according to claim 1, wherein at least one of an inductor and a capacitor is connected to the primary coils, which are connected in series, of the transformers.

14. A driving device for a vibration actuator equipped with a vibrator device and a contact member that move relatively and mutually, the driving device comprising:
a drive signal generator that generates an alternating voltage applied to the vibrator device;
an amplitude detector that detects amplitude of an electric current flowing to the vibrator device; and
a drive signal controller that controls the alternating voltage that the drive signal generator generates according to the amplitude of the electric current,
wherein the vibrator device comprises:
transformers of which primary coils are connected in series, and
vibrators that are respectively connected in parallel to secondary coils of the transformers, and
wherein the vibrators are arranged so as to drive the contact member to rotate or move linearly.

15. The driving device for the vibration actuator according to claim 14, wherein the amplitude detector detects occurrence of failure in a case where increase in the electric current is more than a predetermined amount.

16. The driving device for the vibration actuator according to claim 15, further comprising a torque detector that detects torque applied to the contact member,
wherein the drive signal controller controls the alternating voltage that the drive signal generator generates according to the torque detected by the torque detector and the amplitude of the electric current.

17. The driving device for the vibration actuator according to claim 14, wherein the drive signal generator generates an alternating voltage in which alternating voltages of different frequency ranges are composited,
wherein the amplitude detector detects the amplitude of the electric current about each of the different frequency ranges, and
wherein the drive signal controller controls the alternating voltage that the drive signal generator generates about each of the different frequency ranges.

* * * * *